(12) United States Patent
Kane et al.

(10) Patent No.: US 8,271,878 B2
(45) Date of Patent: Sep. 18, 2012

(54) BEHAVIOR-BASED SELECTION OF ITEMS TO PRESENT ON AFFILIATE SITES

(75) Inventors: Francis J. Kane, Sammamish, WA (US); Cory Hicks, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 1284 days.

(21) Appl. No.: 11/966,822

(22) Filed: Dec. 28, 2007

(65) Prior Publication Data

US 2009/0172551 A1  Jul. 2, 2009

(51) Int. Cl.
*G06F 3/00* (2006.01)

(52) U.S. Cl. .................... 715/733; 715/744; 715/745

(58) Field of Classification Search .......... 715/744, 715/745, 733; 705/14.16
See application file for complete search history.

(56) References Cited

U.S. PATENT DOCUMENTS

| | | | |
|---|---|---|---|
| 6,029,141 A * | 2/2000 | Bezos et al. ............... | 705/27.1 |
| 6,356,879 B2 * | 3/2002 | Aggarwal et al. .......... | 705/26.62 |
| 6,484,149 B1 | 11/2002 | Jammes et al. | |
| 6,845,374 B1 | 1/2005 | Oliver et al. | |
| 6,912,505 B2 | 6/2005 | Linden et al. | |
| 6,981,040 B1 | 12/2005 | Konig et al. | |
| 7,114,170 B2 | 9/2006 | Harris et al. | |
| 7,159,023 B2 | 1/2007 | Tufts | |
| 7,200,551 B1 | 4/2007 | Senez | |
| 7,657,626 B1 | 2/2010 | Zwicky | |
| 7,797,197 B2 * | 9/2010 | Kumar et al. ................ | 705/26.1 |
| 7,827,055 B1 * | 11/2010 | Snodgrass et al. ......... | 705/14.26 |
| 7,881,984 B2 | 2/2011 | Kane, Jr. et al. | |
| 7,930,207 B2 * | 4/2011 | Merriman et al. ......... | 705/14.66 |
| 7,975,020 B1 | 7/2011 | Green et al. | |
| 2002/0010625 A1 | 1/2002 | Smith et al. | |
| 2002/0019856 A1 | 2/2002 | Bezos et al. | |
| 2002/0065802 A1 | 5/2002 | Uchiyama | |
| 2002/0082923 A1 * | 6/2002 | Merriman et al. .......... | 705/14 |
| 2002/0111856 A1 * | 8/2002 | Messer et al. ............. | 705/14 |
| 2002/0120567 A1 | 8/2002 | Caplan et al. | |
| 2002/0198882 A1 * | 12/2002 | Linden et al. .............. | 707/10 |
| 2003/0105722 A1 | 6/2003 | Welt | |

(Continued)

OTHER PUBLICATIONS

Internetnews.com article titled "Widgets Come to Amazon Associates," by Nicholas Carlson, dated Sep. 21, 2007, printed from http://www.internetnews.com/ec-news/article.php/3701006 on Jan. 2, 2008.

(Continued)

*Primary Examiner* — Omar Abdul-Ali
(74) *Attorney, Agent, or Firm* — Knobbe, Martens, Olson & Bear LLP

(57) ABSTRACT

A content provider system interacts with a network of web sites to provide behavior-based content to users. Operators of the web sites add widgets to selected web pages of their sites. The widgets, when executed on the computing devices of users who view the selected web pages, report user-generated events to the content provider system. The content provider system analyzes the reported events to detect behavioral associations between particular web sites, web pages, products, and/or other types of items. The widgets may also retrieve and display behavior-based content that is based on these item-to-item behavioral associations. For example, when a user views a particular web page, a widget on that page may request and display descriptions of, and links to, other sites or pages that are (a) behaviorally related to the page being viewed or an item represented thereon, and/or (b) behaviorally related to the past browsing activities of the particular user.

22 Claims, 8 Drawing Sheets

U.S. PATENT DOCUMENTS

| | | | | |
|---|---|---|---|---|
| 2003/0220837 | A1* | 11/2003 | Asayama | 705/14 |
| 2004/0044566 | A1* | 3/2004 | Bostelmann et al. | 705/14 |
| 2004/0103186 | A1 | 5/2004 | Casati et al. | |
| 2004/0122943 | A1 | 6/2004 | Error et al. | |
| 2005/0033652 | A1 | 2/2005 | Brentano et al. | |
| 2005/0033803 | A1* | 2/2005 | Vleet et al. | 709/203 |
| 2005/0038819 | A1 | 2/2005 | Hicken et al. | |
| 2005/0071251 | A1 | 3/2005 | Linden et al. | |
| 2005/0222987 | A1 | 10/2005 | Vadon | |
| 2006/0085280 | A1 | 4/2006 | Murnan et al. | |
| 2006/0161553 | A1 | 7/2006 | Woo | |
| 2007/0005437 | A1 | 1/2007 | Stoppelman | |
| 2007/0061313 | A1 | 3/2007 | Kahle et al. | |
| 2007/0156527 | A1 | 7/2007 | Rubinstein | |
| 2007/0208729 | A1* | 9/2007 | Martino | 707/5 |
| 2008/0004989 | A1* | 1/2008 | Yi | 705/27 |
| 2008/0010344 | A1 | 1/2008 | Wherry et al. | |
| 2008/0027809 | A1* | 1/2008 | Storm | 705/14 |
| 2008/0040653 | A1 | 2/2008 | Levine | |
| 2008/0077478 | A1* | 3/2008 | Kim | 705/10 |
| 2008/0097871 | A1 | 4/2008 | Williams et al. | |
| 2009/0171755 | A1* | 7/2009 | Kane et al. | 705/10 |
| 2009/0307234 | A1* | 12/2009 | Zrike et al. | 707/10 |
| 2010/0161400 | A1* | 6/2010 | Snodgrass et al. | 705/14.16 |

OTHER PUBLICATIONS

Blog entry titled "New Widgets from Amazon Associates," dated Mar. 29, 2007, printed from http://everything.typepad.com/blog/2007/03/new_widgets_fro.html on Jan. 7, 2008.

Blog entry titled "Amazon: Widgetizing Recommendations," dated May 25, 2007, printed from http://www.readwriteweb.com/archives/amazon_widgetizing_recommendations.php on Jan. 7, 2008.

Press release titled "Aggregate Knowledge Piques Consumer Demand for Discovery," dated Nov. 5, 2007, printed from http://www.aggregateknowledge.com/releases/pr_071105_pique.html on Jan. 7, 2008.

Blog entry titled "Funded Widgets: Minekey," dated Aug. 6, 2007, printed from http://www.sexywidget.com/my_weblog/2007/08/funded-widgets-.html on Jan. 7, 2008.

Blog entry titled "Spotback introduces: Cross-site recommendations," dated Jul. 26, 2007, printed from http://blog.spotback.com/spotback-introduces-cross-site-recommendations/ on Jan. 2, 2008.

Brochure titled "Pique Affiliate Discovery," dated 2007, printed from http://www.aggregateknowledge.com/pique_retail_affiliate.pdf on Jan. 2, 2008.

Web page titled "CleverSet® Product Recommender Quick Start Guide," printed from http://www.cleverset.com/api/quick-start.html on Jan. 2, 2008.

Frankowski, D., et al., "Recommenders everywhere: the WikiLens community-maintained recommender system," Proceedings of the 2007 international symposium on Wikis, pp. 47-60, ACM, 2007 (ISBN:978-1-59593-861-9).

U.S. Appl. No. 11/694,758, filed Mar. 30, 2007 (filing receipt, application text and drawings provided).

U.S. Appl. No. 11/694,745, filed Mar. 30, 2007 (filing receipt, application text and drawings provided).

U.S. Appl. No. 10/127,358, filed Apr. 19, 2002 (filing receipt, application text and drawings provided).

U.S. Appl. No. 11/182,517, filed Jul. 15, 2005 (filing receipt, application text and drawings provided).

U.S. Appl. No. 10/864,288, filed Jun. 9, 2004 (filing receipt, application text and drawings provided).

U.S. Appl. No. 10/766,368, filed Jan. 28, 2004 (filing receipt, application text and drawings provided). This commonly-owned application describes features that were implemented on the Amazon.com web site more than one year before the filing date of the present application. Applicants request that this prior application be treated as prior art for examination purposes; however, Applicants reserve the right to show that certain disclosed features were not released more than one year before the filing of the present application and are therefore not prior art under 102(b).

U.S. Appl. No. 09/876,611, filed Jun. 7, 2001 (filing receipt, application text and drawings provided).

1-page document titled "Disclosure of Concurrently-Filed Applications."

International Search Report and Written Opinion of International Appl. No. PCT/US 08/87536, which contains substantially the same disclosure as the present application.

PR Newswire: "Finjan's SurfinGate Software Achieves Scalability With Cisco Systems' LocalDirector," New York: May 11, 1999, p. 1.

* cited by examiner

FIG. 2

```
1   <script type="text/javascript"><!--
2   //Copyright 2007
3     var cps_websiteOperatorId = "site07-20";
4     var cps_ItemId = "gadget1470";
5         // (Note that ItemId may not be strictly necessary.
6         //  If not provided, may use URL of enclosing page.)
7     var cps-width = "728";
8     var cps-height = "90";
9
10    var cps-q = "http://cps.com/cm?; // content provider system server URI
11
12        // Set Display options for widget content
13        if(cps-price=="all") {cps_q+="&mp=1";}    // include prices in recommendations?
14        if(cps-border=='hide') {cps_q+=1";}    // Display a border around the widget content?
15        if(cps_logo=='hide') {cps-q+="&h1=1";}
16        if(cps-product-images=='hide') {cps_q+="&hp=1";}    // Display product images?
17        if(cps_link_target=="new") {cps_q+="&tg+_blank";}    // Open recommendation in new window
18        if(cps_discount=="add") {cps_q+="&dsc=1";}
19
20        if(window.cps_categories) {cps_q+='&incats='+cps-categories;}    // use Item Type IDs?
21
22        cps_q+="&request+RecordEvent-GetRecommendations";    // widget-generated request
23            // (Note request may be optional and may be overridden by cps.)
24
25        document.write(
26          '<iframe src="'
27          + cps_generate_url()
28          + '" marginwidth="0" marginheight="0" width="' + cps_width
29          + '" height+"' + cps_height
30          + '" border="0" frameborder="0" style="border:none;" scrolling="no">
31    </iframe>');
32    //--></script>
33
34
```

*FIG. 8*

BEHAVIOR-BASED SELECTION OF ITEMS TO PRESENT ON AFFILIATE SITES

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

Relatively large and sophisticated web sites typically implement some form of personalization system to provide personalized content, such as personalized item recommendations, to their users. Such personalization systems may, for example, monitor and record one or more types of item-related user activity such as item purchases, item viewing events, and/or item rentals, and analyze the collected data to detect and quantify associations between particular items. When a user accesses a particular item, such as a particular product in a catalog of an e-commerce site, or an article on a news site, an appropriate message may be displayed notifying the user of related items (e.g., "people who viewed this item also viewed . . . ," or "based on your recent purchases, you may also be interested in . . . "). The personalization system may also generate personalized item recommendations that are based on a target user's purchase history, item viewing history, item ratings, and/or some other type of user data.

Unfortunately, personalization systems can be expensive to implement and maintain. For example, a relatively sophisticated personalization system typically requires infrastructure components which, among other tasks, store customer behavior data, process the stored behavior data to detect the item associations, and store databases which relate items to one another. As a catalog of items to be recommended increases, the amount of data and computing power needed to generate the recommendations grows significantly. As a result, among other reasons, sophisticated personalization systems are implemented, in many cases, by relatively large companies that can start and maintain such systems.

Moreover, for a variety of reasons, some personalization systems tend to rely on a limited set of behavioral data from which to provide personalized content. Since the value to end-users of personalization services is dependent on the size and quality of the underlying datasets from which personalization associations are drawn, further improvements in the amount and application of behavioral data captured is desirable.

BRIEF DESCRIPTION OF THE DRAWINGS

FIG. 2 illustrates the widget-based display of behavioral content on a web page of a member site;

FIG. 8 illustrates in pseudocode one JavaScript-based embodiment of a widget.

DETAILED DESCRIPTION OF SPECIFIC EMBODIMENTS

Figure 1:
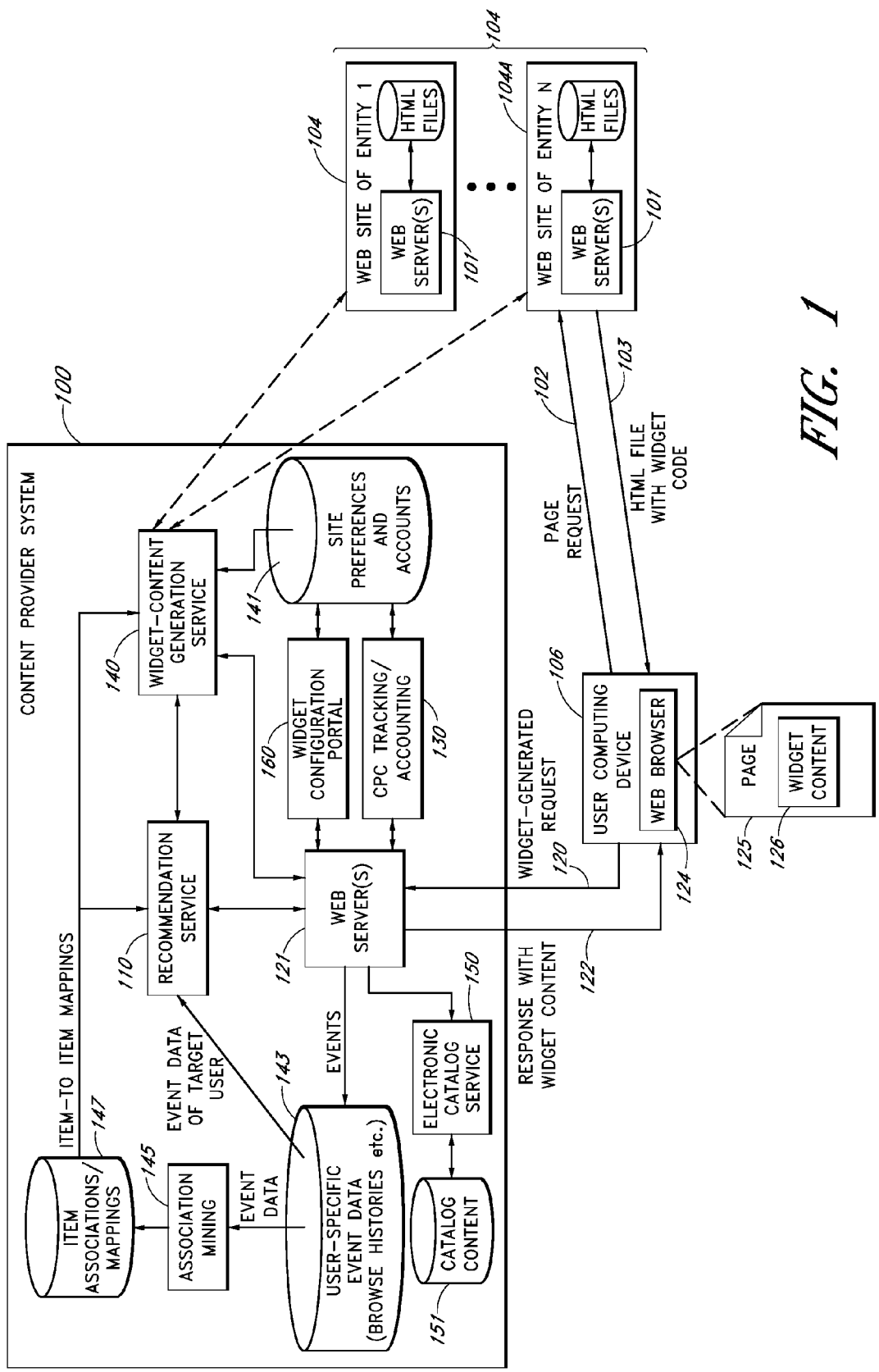
FIG. 1 schematically illustrates one embodiment of a content provider system that monitors user actions across, and generates behavioral content for display on, a plurality of member web sites.

A system that embodies multiple different inventions will now be described with reference to the drawings. As will be apparent, many of the inventive features described herein may be used independently of others, and may be implemented differently than described herein. Thus, nothing in this detailed description is intended to imply that any particular feature, characteristic, or component of the disclosed system is essential. The invention is defined only by the claims.

I. OVERVIEW

A system is disclosed that uses web page widgets to collect behavioral data descriptive of user activities across a plurality of web sites. (The term "widget" refers generally to executable code that is or can be included in a web page or other document.) For example, when a user accesses a web page that includes a widget, the widget may cause the user's browser/computer to report the access event over the Internet to a monitoring system. The reported event data may, for example, consist of the URL accessed and a user or client system identifier, or may include more detailed information such as an item type identifier (e.g., product, news story, blog, etc.), an item identifier, and/or an event type (e.g., view, purchase, download, etc.).

The collected clickstream data of many users is analyzed on an aggregated basis to detect behavioral associations between one or more types of items, such as web sites, web pages, user profiles (e.g. professional or social networking profiles), products, product categories, news stories, news feeds, blogs, music files, video files, documents, keywords, etc. These item-to-item behavioral associations may include both intra-site associations (e.g., page A on site A is related to page B on site A) and inter-site or "cross-site" associations (e.g., site A is related to site B, or page A on site B is related to page C on site D). In addition, the collected data may be used to detect behavioral associations between disparate item types (e.g., site A is related to product B available from site C).

The widgets may also be used to display various types of behavior-based content on the accessed web pages. This behavioral content may be derived from the item-to-item behavioral associations mined from the aggregated behavioral data. For example, when a user accesses a particular web page, the widget included on the page may retrieve and display images or other descriptions of particular items (e.g., web sites, web pages, products, etc.) that are related to the particular page or site being accessed. Each such image or description may serve as a link for accessing the displayed item. For instance, while viewing a page of site A, a user may be presented with a thumbnail image of the home page of related site B, and may be able to click on this image to access site B. The behavioral content may be served by a system that also handles the tasks of collecting and analyzing the widget-reported behavioral data. This system is referred to herein as a "content provider system," as it supplies content for display on web pages.

The behavioral content displayed by the widgets can additionally or alternatively include personalized item recommendations. For example, the content provider system may use a browser cookie transmitted with a widget-generated request to look up a set of items (web sites, web pages, products, etc.) recently accessed by the user. The content provider system may then use these items, in combination with the behavior-based item-to-item associations, to select a set of additional items to recommend to the user. For example, if the user has recently accessed sites A and B, and is now accessing site C, the widget may recommend additional web sites (and/or other types of items) that are collectively related to sites A, B and C.

Figure 2:
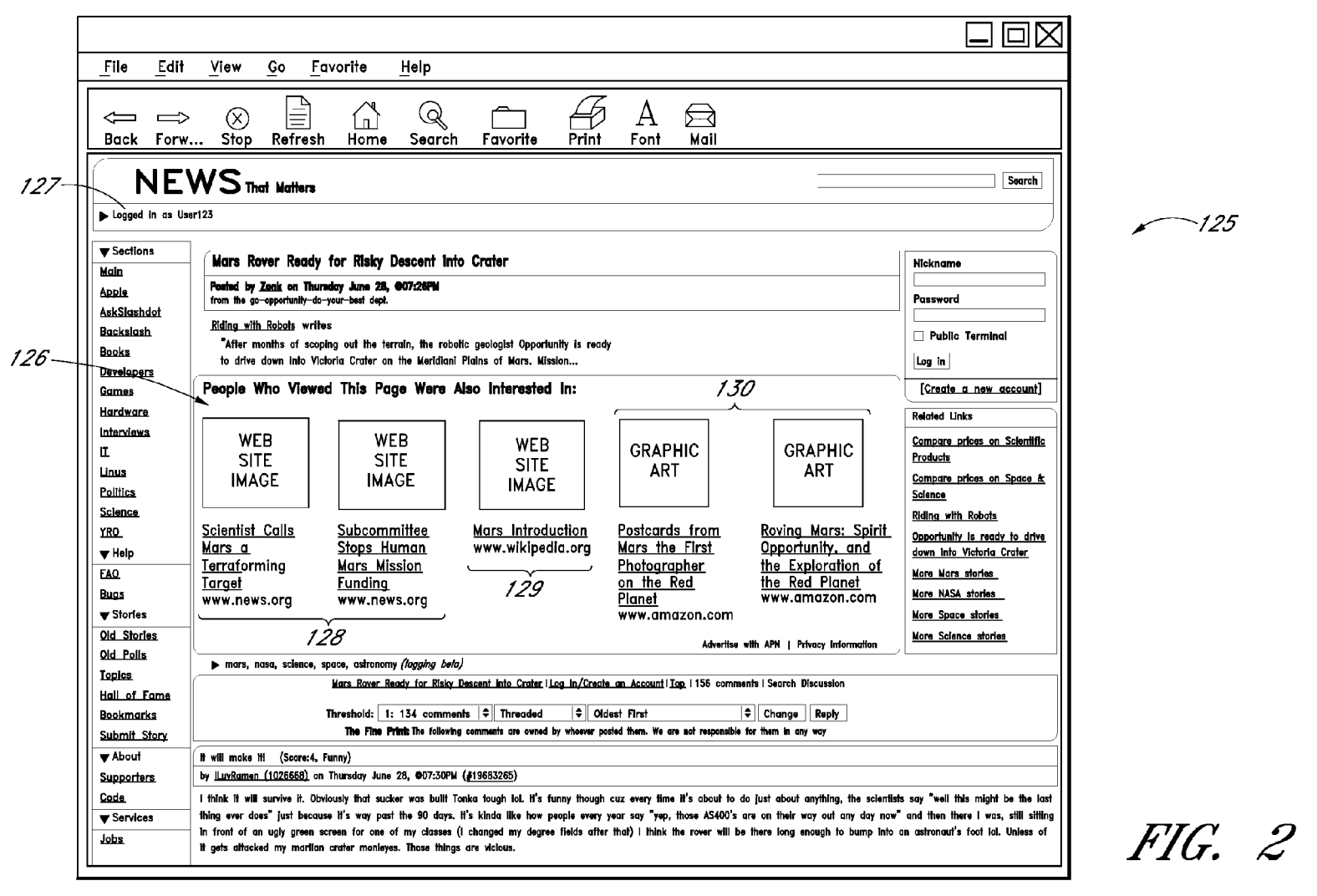

FIG. 2 illustrates one example of how a widget may present a set of behaviorally-related items on a web page that may be hosted externally to the content provider system. In this particular example, five items are depicted under the heading "people who viewed this page were also interested in." Starting from the left, the first two items 128 are web pages on the "news.org" site currently being accessed by the user; the second item 129 is a web page on another external web site, and the last two items 130 are particular book titles available from a merchant associated with the content provider system 130. The actual images and associated artwork of these items are omitted from the figure to improve the quality of the drawing. Each image serves as, or is accompanied by, a user-selectable link to a corresponding web page. In this particular example, the widget is displaying items that have co-occurred relatively frequently in the item viewing histories of users who have accessed this particular web page. The past browsing history of this particular user may also be taken into consideration in selecting the items to display, such that the display represents a personalized set of recommendations.

FIG. 2 represents just one of many types of associations or recommendations that can be presented via widgets. As another example, when a user views a particular product on a merchant website, the user may be presented with one or more widget-displayed links to web pages (of the same web site and/or other sites) that are related to this product. For instance, a product detail page (e.g. a page about a product made available for consumption from an electronic catalog) for a Harry Potter book may display a link to an external message board with users discussing this book or to a news site providing sales figures. Other examples (in terms of the labels that may accompany the behaviorally related items) include the following: (a) people who viewed this page bought the following products; (b) people who viewed this page also viewed the following blogs; (c) people who viewed this web site also viewed the following web sites; (d) people who viewed this story also viewed the following stories on this site; (e) people who viewed this article on site A also viewed the following article on site B; (f) people who viewed this story watched the following video clips; (g) people who viewed this web site also clicked on the following ads, (h) the following items are recommended based on your visit to this and other web sites; (i) the following items are recommended based on your purchases, ratings, and/or visits. These descriptive labels may, but need not, actually be included in the widget-generated display 126. Although a product detail page for a merchant is described above, other types of item detail pages are contemplated. For example, news article detail pages, social profile detail pages, movie rental detail pages, among others. Such pages may include one or more of an item description, image of the item, user reviews, and other information about the item.

One potential benefit of the system, in some embodiments, is that it enables web site operators to provide personalized and other behavior-based content on their web sites without setting up extensive infrastructure for generating such content. For example, by simply adding a widget to one or more web pages, an operator of a relatively basic web site (e.g., one that merely serves static web pages) can configure the site to provide personalized recommendations to its users. Another potential benefit is that the system can generate personalized item recommendations based on the target user's browsing activities across many different (widget-enabled) web sites of many different business entities. Thus, the recommendations may more accurately reflect the interests of the target user.

The content provider system may, in some embodiments, implement a referral program that enables participating web site operators to pay for incoming user referrals, and/or to be paid for outgoing user referrals. For instance, when a user viewing site A clicks on a widget-displayed link to site B, the content provider system may charge the operator of site B a fee, and may credit all or a portion of this fee to the operator of site A. Payment of fees may alternatively be contingent upon the user performing some action (e.g., enrolling or making a purchase) on the referred-to web site.

The content provider system may, in some embodiments, be operated by a merchant or other e-commerce entity that hosts a web site having a browsable electronic catalog of products. In such embodiments, the e-commerce entity may use the widget-reported behavioral data to provide improved product recommendations to users of its site. For example, the e-commerce entity can provide personalized product recommendations to a target user based on a combination of (a) the target user's purchases and/or other product selections on the web site of the e-commerce entity, and (b) widget-reported data regarding the user's accesses to other web sites. These product recommendations may be presented to users on the web site of the e-commerce entity, and/or on other web sites via the widgets. The e-commerce entity may also implement an affiliate program for compensating operators of web sites that display the product recommendations. For example, while viewing a page of an affiliate web site, a user may be presented with widget-displayed product recommendations together with links to corresponding product detail pages in the e-commerce entity's catalog. If the user clicks on one of these links and then makes a purchase from the e-commerce entity's web site, the e-commerce entity may pay a commission or other fee to the operator of the affiliate web site. In some embodiments, the e-commerce entity may additionally or alternatively pay the affiliate/operator for the click-through event without regard to whether the user makes purchase, or may pay the affiliate if the user performs another type of activity. For example, the activity could be any that the e-commerce entity considers as providing benefit, such as the user: creating a new account, signing up for a credit card offered by the merchant, clicking on an advertisement, adding a review or other user-generated content, among many other possibilities.

II. SYSTEM ARCHITECTURE (FIG. 1)

FIG. 1 illustrates one embodiment of a content provider system 100 operated by a content provider business entity. (Although the term "content provider" is sometimes used in the art to refer to an original creator or author of content, the term is used more generally herein to refer to an entity or system that provides content to users.) The content provider system 100 comprises a combination of hardware and software for interacting over a local (LAN) or wide-area network (WAN), such as the Internet, with user computing devices 106 (one shown) of end users. The user computing devices 106 may, for example, include personal computers, personal digital assistants (PDAs), mobile phones, electronic book readers, interactive television systems, set top boxes for televisions, and other types of devices that include web browsing capabilities. In the particular embodiment shown in FIG. 1, the content provider system also hosts an e-commerce web site that includes functionality for users to browse and make purchases from an electronic catalog of items, and to rate and tag particular catalog items. As will be recognized, however, the content provider system 100 and content provider entity need not be associated with any, or any particular type of, e-commerce site or business.

FIG. 1 also depicts a plurality of web sites 104 operated by a plurality of entities. Each web site 104 comprises a web server 101 (implemented as one or more physical servers) for receiving and responding to page requests from browsers/computing devices 106 of end users. In some instances, an end user may be an automated agent or "bot" that emulates an actual user, or may be a group of individuals who share a computer. Each web site 104 includes at least one HTML file that includes widget code for interacting with the content provider system 100. As described below, the content provider system 100 may host a web site that provides an interactive service for the web site operators to obtain customized widgets to add to pages of their sites 104. (The term "operator" or "site owner," as used herein in the context of a member site 104, refers generally to the business entity or individual primarily responsible for the member site's content.)

The web sites 104 that include widget code for interacting with the content provider system 100, and the operators of these sites 104, may be referred to herein as being "members" of the content provider's network. Ideally, many thousands of independent web sites are members of this network, such that a significant segment of users' web browsing activities can be monitored. A web site operator wishing to become a member of this network may do so in some embodiments by registering with the content provider's widget service. As part of this process, the system 100 may assign a unique member ID to the member site 104 or to its operator.

Some of the web sites 104 may host electronic catalogs or repositories of items that are available for purchase, rent, download, subscription, viewing, and/or some other form of consumption. Examples include retailer web sites, music and video download sites, online travel reservation sites, news sites, auction sites, shopping portals, dating sites, social networking sites, aggregator sites, and sites that provide a combination of these functions. As such, as used herein, the term "item" is used broadly and without limitation, and includes generally any object which may be selected by a user to be displayed, purchased, rented, downloaded, subscribed to, or otherwise acted upon. Examples of items include web pages, web sites, URLs, physical products, digital products, blogs, blog entries, news articles, RSS feeds, advertisements, social networking applications, users, and podcasts.

The member web sites 104 may be operated or provided by different business entities from one another and by entities other than the operator/provider of the content provider system 100. In a typical scenario, an end user 106 visits a particular web site 104A and accesses an electronic catalog or repository of items hosted by the web site 104A. The end user 106 initiates an access to a particular page of web site 104A by causing a page request 102 to be sent to the web server 101 of the web site 104A. The page request 102 typically corresponds to some action, which may be a request to view the home page of web site, to view a particular item or category of items, to process a purchase of an item, and so forth. The web server 101 typically responds to the page request 102 with an HTML file 103 of a web page 125, although other markup languages such as XHTML may be used. The HTML files 103 typically contains static and/or dynamic content, such as descriptions of items, hypertext links to other items on or external to the web site 104A, purchase confirmations, and any other information germane to the page request 102.

The HTML file 103 also includes a format-appropriate mechanism for instantiating a widget on the end-user's computing device 106. The widget may comprise, for example, JavaScript code, although the widgets may also be implemented using Adobe Flash, ActiveX, VBScript, or another scripting language. The widget may be fully contained in an HTML file 103 as served by the web server 101. In one embodiment, the HTML file contains a portion of the widget (e.g., a single line of code) that causes the browser 124 to dynamically load one or more widget code modules from the content provider system 100 and/or the browser's cache. In some cases, the operator of the web site 104A may provide its own widget code designed to interoperate with the content provider system 100.

Upon receipt of the HTML file 103 containing the widget code, the browser 124 on the end-user's computer will, in some embodiments, instantiate the widget by executing the widget code. The widget may include or have access to parameters that describe the context of the web page and page request, an item identifier, an event identifier (which may codify the events "purchase," "view," "add to cart," and so forth), a user identifier, if known, default content to be displayed in the absence of (or before retrieval of) content from the provider system, the member ID of the member site 104 on which the widget is installed, and so forth. These identifiers may be created programmatically by the operator; alternatively, in some embodiments, the operator need not provide any special parameters, and the widget and content provider system 100 may infer parameters as discussed below. (For example, the content provider system may use part of the URI of the web page 125 as an item identifier.) In this manner, the content provider system 100 provides flexibility to the operators of the member web sites 104: some may choose detailed customization of widgets with fine-grained control over parameters, while others may choose a "plug and play" approach comprising little more than, for example, adding a couple lines of JavaScript to selected web pages 125. This JavaScript is potentially automatically generated for the operators by content provider 100.

Once instantiated on an end user's computing device 106, the widget may generate at least one request 120 to a web server 121, or another type of server, of the content-provider system 100. These requests may, but need not, be made in accordance with an API (Application Program Interface) or a web services interface. The widget-generated request 120 may contain information regarding the context of the web page 103 and/or page request 102, such as the URL of the web page, an identifier of an item associated with the web page, an event type identifier, and/or a user identifier. Additionally, the widget-generated request may include a browser cookie that includes a user identifier (which may be the same as or different from the previously-mentioned user identifier), a session identifier, or both. The user identifiers may identify particular user computing devices 106 or clients without identifying particular individuals. Thus, for example, if multiple family members share a particular computer 106, the system 100 may treat these family members collectively as a single user. The widget-generated request 120 may also include the member ID of the corresponding member site 104; for example, a widget installed on a page of member site A may be configured to send site A's member ID with the requests 120 it generates.

As end users perform specific types of item-related events (e.g., web page accesses, web site accesses, item purchases, item downloads, item rentals, item viewing events, etc.), the widgets embedded in the associated web pages 125 report these events to the content provider system 100 via widget-generated requests 120. As will be discussed more fully below, the content provider system 100 may persistently store these events (i.e., data descriptive of the events) in an event history repository 143 as part of a given end-user's event history. The event history of a given user may reflect the user's accesses to many different member sites 104, and may also reflect user actions performed on a web site of the content provider.

The widget-generated requests 120 may also include requests for widget content 126 to be displayed on the web page 125. Requests for content may be included as part of an event-reporting request as described above, or may form a separate request. As the content provider system 100 receives widget-generated requests 120 for content, the content-provider system 100 uses the context information provided in the widget request 120, coupled with item-to-item behavioral associations derived from aggregated user event histories, to generate or select widget content 126 to be displayed. This content is referred to as "behavior-based" or "behavioral" content, meaning that it is dependent upon monitored behaviors of the current user and/or other users. In some cases, the widget content 126 presented to the user may depend on (1) the user's identity on an e-commerce site hosted by the commerce system, and/or (2) the user's identity on the member site 104 being accessed or across the member sites 104 generally.

In some cases, the widget content 126 may additionally or alternatively include items selected based on content-based (as opposed to behavior-based) associations between items. For example, while viewing a particular web page, the user may be presented with links to other pages containing similar content or keywords. The content provider system may use content-based associations where, for example, an insufficient quantity of behavioral data exists to generate reliable behavior-based associations for a particular item. Hybrid content-based/behavior-based associations may also be used.

In the illustrated embodiment, when a web server 121 of the content provider system 100 receives a widget-generated content request 120, the web server returns a response 122 with the requested content 126. In one embodiment, the response is a HTML document that is configured to be embedded in an IFrame (inline frame) within the main HTML document 103 that is loaded from the member site 104. This embedded HTML document may include thumbnail images of, and links corresponding to, the particular items selected by the system 100 to display (as described above and shown in FIG. 2). The content provider system 100 may generate the thumbnail images of the member sites' pages on-the-fly in response to widget-generated requests 120, and/or may pre-generate and cache these images. Upon receiving the response 122, the widget/browser displays the widget content 126 on the user computing device 106 as part of the web page 125.

The widget content 126 may be non-user-specific, such as descriptions of items that are behaviorally related, and/or related based on a content-based analysis, to a source item being viewed. For example, the widget may present thumbnail images of, and links to, other web sites and/or pages that are behaviorally related, and/or related based on a keyword analysis, to the site 104A or page 125 being accessed. See FIG. 2. The widget content 126 may additionally or alternatively include personalized item recommendations that depend upon the prior event history of this particular user. This prior event history may include or consist of actions performed by the user on other member web sites 104.

Thus, the act of browsing to a given site 104A may cause a page 125 to be displayed in the user's web browser 124 with behavior-based widget content 126 supplied by the content provider system 100. Because this content reflects user actions/events across many web sites, the behavior-based content tends to be highly relevant to the web page or site being viewed and/or the particular user.

As mentioned above, the content provider system 100 includes a data repository 143 that stores user-specific event histories. The events included in these event histories may consist of widget-reported events of the type described above. In some embodiments, the event histories also include events reported or monitored by one or more other types of entities. For example, if the content provider system 100 hosts its own electronic catalog of items (as in FIG. 1), a user's event history may include event data descriptive of any items the user has purchased, viewed, rated, or otherwise selected from this catalog; these events may be captured by the system 100 without the use of widgets. As another example, some web sites 104 may be configured to report events directly to the content provider system 100 via a web services interface, as described in U.S. application Ser. No. 11/694,758, filed Mar. 30, 2007, the disclosure of which is hereby incorporated by reference. As another example, end users may be given the option to install a browser toolbar/plug-in that reports browsing events to the content provider system 100; in such embodiments, the event histories may reflect user browsing activities on web sites that are not part of the content provider's network. Thus, the event history of a given user may include events captured via multiple methods, including widget-based and non-widget-based methods. Although a single event-history data repository 143 is shown, different types of events or event histories may be recorded separately from others (e.g., in separate databases).

The user event histories may also reflect user selections of items displayed by the widgets. For example, with reference to FIG. 2, each of the five widget-displayed items/links may actually point to the content provider system 100. Thus, when a user selects a particular widget-displayed item, the content provider system may record the selection event and redirect the user's browser 124 to retrieve the content from a web site 104 based on the user's perceived selection. The widget-displayed links 128, 129, 130 may alternatively point directly to their respective destination locations.

In some embodiments, the content provider system 100 may cache web pages of the member sites 104. In these embodiments, the content provider system 100 may serve pages of the member sites 104 to user computing devices 106. As one example, suppose a page of member site A hosts a widget that displays a link to a target page of member site B. User selection of this link may cause the user's computing device 106 to request the target page from the content provider system 100. If the content provider system has a copy of this page in its cache, it may return the cached copy directly to the requesting device 106; otherwise, the content provider system may redirect the request to an external server of member site B. In some embodiments, the content provider system 100 may alternatively host the entire member site 104.

The information stored in the data repository 143 for a given event may include some or all of the following: an identifier of the accessed web site (e.g., the member ID of a particular member site 104), the URL accessed, an item identifier (particularly if the item is not uniquely identified by the URL), an item type identifier, an identifier of the user (e.g., a cookie value that uniquely identifies a particular user computing device 106), an identifier of the type of the event (e.g., purchase, view, rent, rate, etc.), and an event timestamp. When the event reflects the selection of an item displayed by a widget, the event data may also identify both the referring site and the referred-to site, which may be the same in some cases. For item rating events, the event data may also include a rating assigned to the item by the user, such as a rating assigned on a scale of one to five stars or a "not interested" rating.

To enable users' actions to be monitored across the network of member sites 104, the content provider system 100 assigns a unique tracking cookie to each user or user computer 106. This cookie may be set when a user computer 106 initially accesses a web page having a widget associated with the content provider system 100, and may subsequently be returned with each widget-generated request to the system 100. The content provider system 100 may also support one or more additional methods for identifying users. For example, if the content provider system hosts an e-commerce web site, the cookies used to identify users of this e-commerce web site may also be used to monitor these users' actions on the member sites 104.

To generate behavior-based content, an association mining component or system 145 (FIG. 1) collectively analyzes the event histories of the end users to detect and quantify similarities/associations between specific items (such as pages, sites, products, stories, etc.). Item-to-item associations of significant strength are recorded in a data repository 147 that maps specific items to behaviorally related items. As illustrated in FIG. 1, these item-to-item mappings are used by a widget-content generation service or system 140 to select items to display in response to widget-generated requests for content. As further illustrated, the widget-content generation service 140 also accesses a recommendation service 110 to obtain personalized recommendations of items to present to recognized users. The recommendation service 110 may generate these personalized recommendations based on, for example, a combination of (a) the target user's past event history as represented in the event history repository 143, (b) the page or other item currently being accessed by the user, and (c) item-to-item associations related to the items accessed by the user. Examples of algorithms that may be used to mine behavioral associations between items, and to use these associations to generate personalized recommendations and other behavior-based content, are described in U.S. application Ser. No. 11/694,758, referenced above, and U.S. Pat. No. 6,912,505, the entire disclosures of which are hereby incorporated by reference.

Advantageously, the events pertaining to one user on one web site 104A may be used to provide behavior-based content for that user on that same site 104A, other users on that same site 104A, that same user on other sites 104, and other users on other sites 104. Because the content provider system 100 is able to track user behavior across multiple, independent web sites 104, it is able to detect "cross-site" associations. For example, the content provider system may detect that Site A and Site B are behaviorally related; that a particular page on Site A is behaviorally related to a particular page on Site B; or that a particular page on Site A is behaviorally related to a particular product available on the content provider's site or another web site. The cross-site associations may be mined, and used to serve behavior-based content to users, without any communication or sharing of information between Site A and Site B, and without otherwise exposing any, potentially sensitive, user information to the operators of the member sites 104.

For example, the content provider system 100 may analyze the item viewing histories of all end users across the member web sites 104—and possibly one or more additional web sites such as an e-commerce site of the content provider—to generate one or more global datasets of item-viewing-based item associations. The content provider system may similarly analyze the item purchase histories of users across these web sites to generate one more datasets of purchase-based item associations. The content provider system may then generate recommendations for a particular user who is viewing a particular item by, for example, retrieving a list of other items associated with that particular item, filtering out items the user has already viewed or purchased, and then ranking the remaining items based on their degrees of similarity to the user's past browsing history. The final behavior-based content presented to the user may then include both non-personalized associations-based content, such as a list of items related to the page or site being viewed, and personalized item recommendations.

The content provider system 100 may separate the generation of associations from the generation of recommendations. In particular, the item-to-item associations may be generated asynchronously (e.g., in an off-line processing mode) with respect to requests by users, whereas recommendations for a given user may be generated synchronously with a request by that user. Thus, the significant processing that is typically performed in mining the behavioral associations need not contribute to page-load times experienced by users.

In some embodiments, the content provider system 100 may perform authentication and/or metering/billing through a tracking and accounting system 130. As will be discussed in more detail below, the operators of the member web sites 104 may be credited or debited based on, among other things, (1) their willingness and desire to enable widget content 126 to be displayed on their web pages 125, (2) the widget content placed on their web page 125 or the web pages of another web site 104, and/or (3) the behavior of end users. For example, when a recommendation for Item A (with a link to Site A) is placed in Site B's widget-content display area 126 on a given page 125, the content provider system 100 may charge Site A's account a certain amount, and may credit a portion of this amount to the account of Site B. More typically, this transfer of money may occur only if the user clicks on the associated link, or in some embodiments, only if the user clicks on this link and thereafter purchases Item A. Tracking of these events, such as clicking and purchasing, is possible due, in part, to the even reporting feature of widgets discussed above. Operators may be able to customize the details of the accounting system as applied to them, such as selecting between various revenue models (cost per click, commission, etc.) or setting bid amounts they are willing to pay for referrals related to a given item.

As depicted by 160 in FIG. 1, operators of the member web sites ("site owners") may use a widget configuration web site or portal 160 to build custom widgets. As part of this process, a site owner may select from various configuration options, including options that specify the types of widget content to be displayed. These selections may be incorporated into the widget code generated by the content provider system 100, and/or may be stored in a site preferences database 141. Examples of specific configuration options are provided below. The system 100 may also support the ability for the site owners to define new item types and event types, and/or to specify how particular item and event types are to be used to mine behavioral associations.

For items that are not uniquely identified by URLs, the content provider system 100 may use an appropriate tracking mechanism to keep track of unique items reported by the widgets/member sites 104. As one example, each reported item may be uniquely identified within the system 100 by the combination of (1) an item type identifier, (2) an item identifier, and (3) a member identifier. The item type identifiers may be globally defined within the system 100, meaning that the same item type identifiers are used across all member sites 104. Examples of item types that may be supported by the system include the following: Product, Browse Node, Advertisement, Article, AudioDownload, Bundle, Car, Comment, Document, Flight, Group, Hotel, Listing, Person, Post, Restaurant, Review, Service, VideoDownload, SearchQuery, WebSite, Journal, Poll, Deal. The item identifiers may be freely assignable by the operators of the member sites 104. Item IDs need not be unique across item types or across member sites 104; for example, two different web sites 104 can use the same item ID to identify different items, and a single member site 104 can use the same item ID to identify two items having different item types. The member ID identifies the member responsible for reporting the item. When a widget reports an item-related event for a non-URL-based item, it may transmit these three pieces of information (i.e., the item type identifier, item identifier, and member ID) to the content provider system 100.

In the embodiment depicted in FIG. 1, the content provider system 100 hosts an e-commerce web site that includes an electronic catalog of items. The catalog is implemented using a catalog service 150, which accesses a repository of catalog content 151. The items included in this catalog may, but need not, overlap with items included in catalogs of one or more member sites 104. Users may browse and make purchases from this catalog without ever accessing any of the sites 104 in the content provider's network. In addition, users may access the sites 104, and be provided with behavior-based content (including personalized item recommendations) on such sites as described above, without ever accessing the e-commerce site. In the embodiment shown, a common web server or set of web servers 121 serves both the widget-generated content requests, and ordinary page requests for pages of the e-commerce web site; however, separate web servers may be dedicated to each of these tasks.

The e-commerce site includes web pages (not shown) that are configured to display personalized recommendations generated by the recommendation service 110. These recommendations may be based on (a) the user's purchases and/or other actions on the e-commerce site, (b) the user's actions on other network-member sites 104, or (c) a combination of (a) and (b). By incorporating external behaviors of activity on web sites 104 into the recommendations process, the e-commerce site is capable of providing improved item recommendations from its own catalog to its users.

In addition, the e-commerce site can provide useful personalized recommendations to a new user who has never previously accessed the e-commerce site. For example, suppose a user accesses member sites A, B and C, and then accesses the e-commerce site for the first time. In response to requesting an initial page of the e-commerce site, the content provider system 100 can use a cookie transmitted with the request to (a) look up this past browsing history, (b) use a dataset of site-to-product behavioral associations/mappings 147 to look up a set of products that are behaviorally related to site A, B and/or C, and (c) incorporate descriptions of these products into the requested web page. The system 100 may also support the opposite scenario: when a customer of the e-commerce site accesses a member site 104 for the first time, the system may rely on the customer's prior activities (e.g., purchases) on the e-commerce site to select items to present to the customer on the member site 104; these items may then be presented via a widget included in a page of the member site 104.

The e-commerce site hosted by the content provider system 100 may also use the cross-site item-to-item mappings 147 to display non-personalized lists of related items on item detail pages of the electronic catalog. For example, when a user requests a particular product detail page of the electronic catalog, the web server 121 may incorporate one or more of the following into the product detail page: (1) external links to behaviorally related member sites 104, (2) external links to behaviorally related web pages of member sites 104, (3) internal links to detail pages of behaviorally related products in the electronic catalog, (4) external links to pages on member sites 104 that display behaviorally related products not available in the electronic catalog. In each of these examples, the links may again be displayed together with associated item images and descriptive text.

FIG. 8 illustrates one example of a JavaScript-based widget that may be included in an HTML document of a member site 104 to enable the associated web page to display product recommendations. In this example, the widget is an IFrame-based widget that causes an HTML document served by the content provider system 100 to be embedded as an inline frame in the host page of the member site 104. The dimensions of this inline frame are specified at lines 28-30. The widget includes variables that specify a unique ID of the member site's operator (see line 3) and a unique ID of an item corresponding to the widget (see line 4). These IDs may be passed to the content provider system 100 with a widget-generated request. Line 22 includes an instruction to generate a request to the content provider system 100 to record an event and to retrieve recommendations. Lines 12-18 specify how the recommended items are to be presented in the inline frame (e.g., with or without prices and product images). Widgets of the type shown in FIG. 8 may be generated automatically by the content provider system 100 based on the settings or preferences associated with the member web site 104, or may be generated by the site owners. Such JavaScript may, when executed, return HTML to render widget content 126 similar to that shown in FIG. 2, with personalized or unpersonalized recommendations generated and displayed in accordance with the dimensions and display attributes specified by the site owner.

With further reference to FIG. 1, each of the functional blocks or components 110, 121, 130, 140, 141, 143, 145, 147, 150, 151, 160 of the content provider system 100 may be implemented in a combination of computer hardware (e.g., general purpose computers or processors) and executable code modules. The code modules may be represented in any type of computer storage or storage medium. The communications between the user computing devices 106 and the content provider system 100, and between the user computing devices 106 and the member web sites 104, may occur over a computer network such as the Internet. The user computing devices 106 may include any type of device that includes web browsing capabilities, such as a Personal Computer, Personal Digital Assistant, mobile phone, interactive television, or settop box. The various components of the system 100 may, in some implementations, be distributed geographically.

III. PROCESSING OF WIDGET-GENERATED REQUESTS (FIG. 3)

Figure 3:
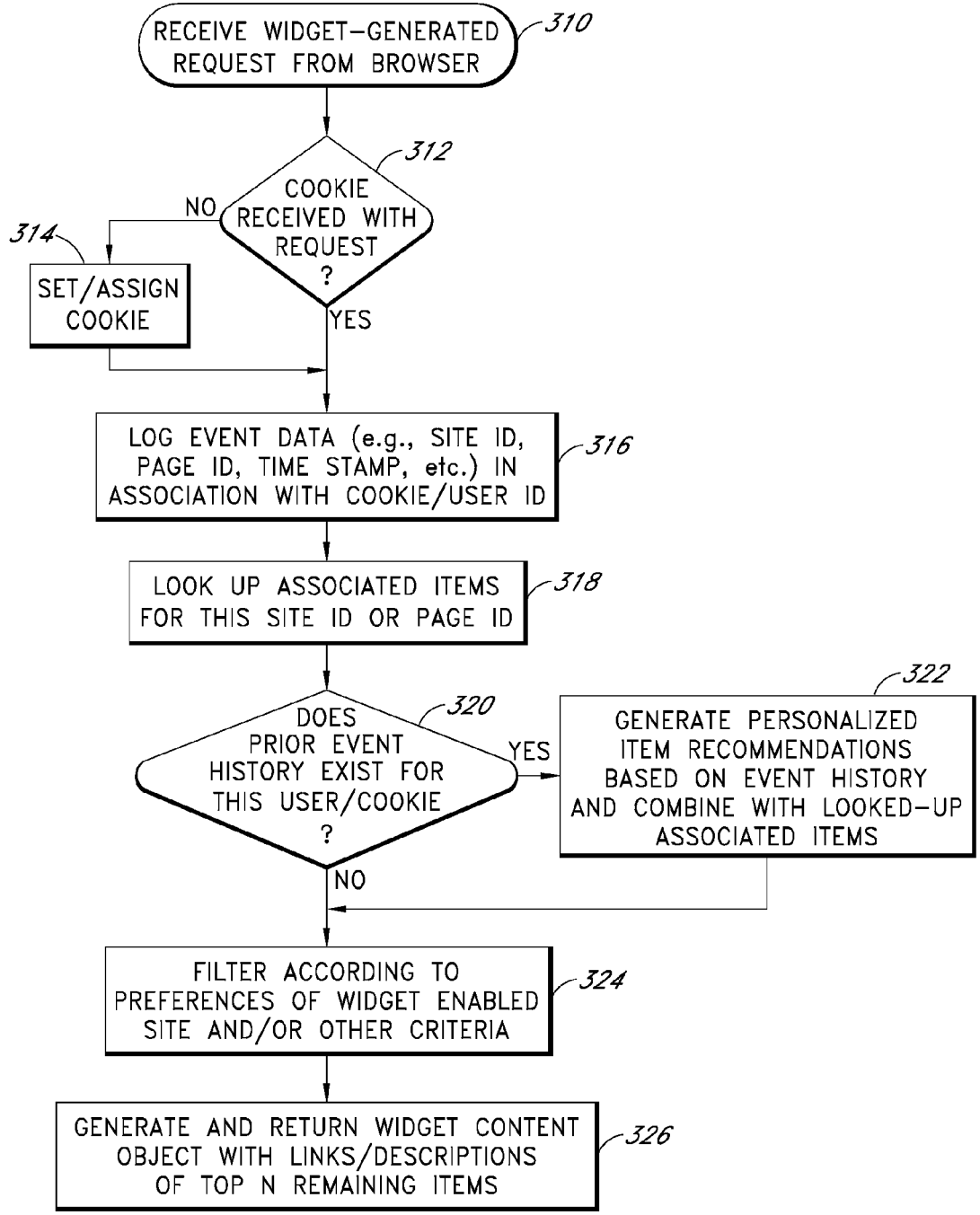
FIG. 3 illustrates one embodiment of a method of storing event data and generating behavior-based content to satisfy widget-generated content requests.

FIG. 3 illustrates one example of how the content provider system 100 may process a widget-generated request. Upon receipt of the request by the web server 121, the system determines, in block 312, whether the request includes one or both of the following types of cookies: (1) a cookie corresponding to the content provider's e-commerce web site, which may exist if this user has accessed or registered with this web site, (2) a cookie set by the content provider system 100 via a widget on a member site 104. The system 100 may cause the identification values for all such cookies to which it has access to be associated with each other in the repository 143.

The system 100 may also attempt to reconcile the various identities that may have been provided to it by the instant widget request and prior requests. For example, if the present widget request includes a cookie for a web site of the content provider, the system 100 may check whether the widget identifier provided in the present request is the same as any widget identifier provided in prior requests (and therefore stored in the repository 143). If such identifiers are not identical, then the web server may cause an association to be stored in the repository 143 that links the two widget identifiers.

Next, as necessary, the system 100 attempts to set or reset cookies containing identification information on the end-user's computing device 106. If the widget-generated request did not include an identifier, the system 100 may create a new user identifier and cookie for placement on the user's computing device 106 (block 314). In the foregoing example of mismatched widget cookies, the web server may choose to reset the widget identifier to the prior value in the repository 143. Similar reconciliation actions may take place for the other data sent in the widget-generated request.

The system 100 may then log the reconciled event data in the repository 143 (block 316). Data to be recorded may include the Site ID, the Item ID, a timestamp, the event type, and/or other event data. The event timestamps may be used to purge "old" event data as needed, with different types of events optionally being retained for longer time periods than others. The event timestamps may also be used to give greater weight to relatively recent user activity—for purposes of generating item-to-item associations and/or for purposes generating personalized recommendations. The Item ID is a generalized identifier and may identify any object whatsoever, and may include goods, services, web pages, syndicated feeds, search queries, and so forth. Preferably, item identifiers are unique values. In some embodiments, the uniform resource identifier (URI) of an object may be used as an item ID for that object.

At block 318, the widget-content generation service (FIG. 1) retrieves item associations for the site 104, page 125, or other item being viewed by the user. This information may be retrieved from the item associations database 110. At blocks 320 and 322, if a prior event history exists for this user/cookie (i.e., an event history with one or more events that occurred prior to the event logged in block 316), the system 100 invokes the recommendation service 110 to generate personalized item recommendations for the user. These recommendations may be generated as described in the above-mentioned patent. The similarities and recommendations to be generated may be limited to a particular relation or type of item based on the general preferences for this web site 104A, the parameters of the widget-generated request 120, and/or user-specific preferences.

The recommendation service 110 may generate the personalized recommendations by retrieving all or a selected portion of the end user's event history from the database of event history data 143 (optionally including the current event logged in block 316), and by accessing the item associations database 147 to look up items that are related to items in this event history. Association scores reflective of the strengths of particular item-to-item associations may also be retrieved from the item associations database 147, and may be used to rank the looked-up items based on overall degree of association to the target user's event history.

In block 324, the widget-content generation service filters out any items that are not appropriate for display. The filtering may be based again upon the general preferences associated with the web site 104A (e.g., item category preferences or a black list), the parameters of the widget-generated request 120, user-specific preferences, and/or other criteria. Next, at block 326, the widget-content generation service 140 generates widget content that encapsulates a top-ranked subset of the remaining items. The widget content 126 may include item descriptions, item images, web links to places where the item may be purchased, and so forth. In the case of products represented in the electronic catalog of the content provider system 100, this content 126 may include or consist of catalog content retrieved from a catalog service 150 (FIG. 1). In the case of external web sites and pages, the widget content 126 may be obtained automatically by periodically generating thumbnail images of, and extracting descriptive text from, the associated web pages. Site owners may also be permitted to upload item descriptions and advertisement creatives to the system 100 for certain types of items.

This widget content may be returned to the web server 121, which constructs a response 122 which includes the generated widget content 126. This response is returned to the user computing device 106, whereupon the user-computing device 106 can display or otherwise make the content available to the end-user. The widget content is preferably displayed as part of the web page 125 as shown in FIG. 2, but may alternatively be displayed in a pop-up window, as an RSS news feed entry, or in a "pop-over" that appears when the user hovers the mouse pointer over a particular object or area of the page 125. In some embodiments the content is read aloud for the hearing impaired.

A variation of the process shown in FIG. 3 may be used for users who have requested not to be tracked. In one embodiment, when a user requests not to be tracked, a privacy cookie is set on the user's computing device 106. If the system 100 receives a widget-generated request that includes such a privacy cookie, the system refrains from persistently logging the event in block 316, and refrains from setting any additional cookies on the user's device 106. In addition, block 322 (generation of personalized recommendations) is skipped, such that the recommendations consist of items associated with the site or page currently being viewed. In the example web page shown in FIG. 2, the user can request not to be tracked by clicking on the "privacy information" link in the widget display area 126 and then selecting a "do not track" option on a privacy settings page of the system 100.

Widgets transmitted via HTTP for display on end-users' browsers are only one type of mechanism that may be used by the content provider system 100. In addition to web widgets, or in complete replacement thereof, a content provider system may use browser toolbar plug-ins, browser extensions, and other types of display mechanisms, including mechanisms that enable ads and other types of content to be displayed on mobile devices.

IV. EXAMPLE USE CASES

The following examples illustrate some of the various ways the content provider system 100 may be used to supply behavior-based content to users. As will be recognized, each use case can be combined with any one or more of the others.

Display of related web sites on member site. The operator of a member site 104 may wish to use the widget service to assist its users in locating other web sites of interest. To add such functionality, the web site operator may augment its home page with a widget that is configured to display outgoing links to other member web sites 104. The widget configuration parameters in this example and the examples below may be incorporated into the widgets themselves, and/or may be stored in the site preferences database 141 of the content provider system 100. When a user accesses the augmented home page, the widget may cause the user's browser 124 to generate a request that identifies the member site 104. The content provider system 100 may respond by accessing the item associations database 147 to look up a list of related web sites 104, and by returning a widget display object 126 with outgoing links to the home pages of these related sites. These links may optionally be displayed as, or in association with, thumbnail images of the corresponding home pages, as described above. The list of related sites may be based on aggregated user browsing histories across many member sites 104. As a variation, the web site operator may configure the widget service such that the widget only displays links to other member sites 104 that pay referral fees. As yet another variation, the widget service may be configured to additionally display personalized web site recommendations to recognized users.

Member site registers to pay referral fees for incoming traffic. As another use case example, the operator of a member site 104 ("the current site") may augment its home page with a widget that merely reports accesses to this page to content provider system 100. (Note that this widget need not display any content to an accessing user.) The operator may also register to pay other member site operators for incoming referrals. While viewing other member sites that are behaviorally related to the current site, users may be presented with links to the current site. If a user follows such a link, the content provider system 100 charges the operator of the current site a referral fee, and pays a portion of this amount to the operator of the referring member site.

Display of intra-site related items on member site. The operator of a member site 104 may wish to use the widget service solely to assist users in finding items of interest on this member site. For example, the member site may be a merchant site that hosts an electronic catalog of items, each of which is displayed on a respective item detail page of the member site. To help users find catalog items of interest, the operator may add a widget to each item detail page, and configure this widget to display other catalog items that are behaviorally related to the item featured on the respective detail page. When a user accesses such a detail page, the associated widget may cause the user's browser to send a request to the content provider system 100 identifying the item featured on the page. The content provider system 100 may respond with a widget display object 126 that includes descriptions of, and internal links to detail pages for, the catalog items (of the member's site) that are the most closely (behaviorally) related to the featured item. This set of related items may be based on aggregated detail-page viewing histories users of the member site 104. This use case can be varied by replacing the catalog items with any other type of item that can be included in or represented on the member site 104 (e.g., news stories, blogs, blog entries, user profile pages, podcasts, video clips, etc.).

Display of intra-site personalized recommendations on member site. In this use case scenario, the web site operator adds widgets to item detail pages as described above, but configures the widgets to display personalized recommendations of the member site's catalog items. If a user who accesses the catalog is recognized by the content provider system 100 and has a meaningful event history, the content provider system may personalize the selection of catalog items to present to the user. For instance, if this user has previously accessed member sites A and B, and these sites have a strong behavioral association with catalog item C in the member site's catalog, catalog item C may be selected to present—regardless of whether this user has previously accessed the current member site. Again, this example can be extended to any other type of item that can be included in or represented on the member site 104.

Collective Electronic Catalog. Operators of web sites that host electronic catalogs of items can be given the option to effectively make their respective electronic catalogs part of a collective (network wide) electronic catalog from which the content provider system 100 can make recommendations. As part of this process, the participating web site operators may add widgets to the item detail pages of these electronic catalogs to enable the content provider system 100 to track one or more types of catalog-item selection events (e.g., detail page viewing events, wish list add events, shopping cart add events, rental queue add events, etc.). The content provider system may use the resulting event data collected across the collective electronic catalog to detect associations between particular catalog items, including both cross-site and intra-site associations. These associations may be used to incorporate both cross-site and intra-site catalog-item recommendations into the widget-enabled item detail pages of the participating sites 104. The electronic catalogs hosted by the individual sites may, but need not, overlap with one another. In some embodiments, an electronic catalog hosted by the content provider system 100 may also be included in the collective electronic catalog.

Participation in affiliates program. In this use case example, the member web site 104 is enrolled in an affiliates program implemented by an e-commerce site of the content provider. Previously, the operator of the member site has manually selected catalog items from the content provider's electronic catalog, and has provided outgoing links to the corresponding item detail pages of the e-commerce site. To increase commissions, the operator of this member site adds widgets to one or more web pages, and configures these widgets to display personalized recommendations of catalog items offered on the e-commerce site. Because the widgets display personalized recommendations of catalog items (and/or catalog items that are behaviorally related to the member site), users are more likely to click through to the e-commerce site and make a purchase. Thus, the operator increases its commissions, and potentially increases traffic to its member site 104. The affiliates program need not be implemented entirely by the content provider system; for example, as is known in the art, certain tasks, such as tracking referral events and calculating commissions, may be performed by a third party service provider that manages the affiliates programs of many e-commerce entities.

Segmentation of users based on clickstream histories. In embodiments in which the content provider operates an e-commerce site, the content provider system 100 may segment/categorize end users that have not yet visited the e-commerce site. When one of these users first accesses the e-commerce site, the category or categories pre-assigned to this user may be used to select products to recommend and/or ads to display. For instance, if the user has previously accessed one or more electronics review sites 104 in the network, the e-commerce site may present the user with an ad or offer related to electronics products. As another example, the content provider system may use the data from member web sites 104 to determine the user's shopper type in order to present relevant content. For example, users who visit deal and coupon websites may be classified as "deal hunters," users of gadget-related blog and news sites might be classified as "early adopters", and users that tend to browse from one page or website to another to discover content may be a "browser" shopper type. This information can then be used, potentially with other information such as spending information, by the e-commerce website to present the users with ads, offers or items based on the shopper type.

Site-to-category associations. One variation of the preceding use case is to use the aggregated event data of many users to compute website-to-product-category associations. These associations may, for example, be based on correlations between accesses to member sites 104 and purchases from particular product categories. For instance, if a relatively large percentage of those who access member site A also purchase a gardening product from the e-commerce site, an association may be created between this member site 104 and the product category "gardening." Once computed, the website-to-product-category associations may be used to select the product category or categories most closely associated with the member site 104 or sites visited by a particular user. Ads or other content corresponding to such product category(ies) may then be targeted to the user.

Where the quantity of behavioral data for a particular member site 104 is insufficient to generate meaningful site-to-product-category associations, content-based associations may alternatively be used. For example, the content provider system 100 could automatically extract characterizing keywords from the web pages of member sites, and generate keyword-to-product-category associations using aggregated event history data of many users. These keyword-to-product-category associations can then be used to map a particular member site 104 (e.g., one for which relatively little behavioral data exists) to a particular product category.

This use case can be extended to other types of item categories, such as blog categories, podcast categories, and news categories.

User-to-user associations. The content provider system 100 could additionally use the collected multi-site clickstream (event) data to compute similarities/associations between particular users. These associations may then be used (with appropriate consent by users) to help users find other users to add to their social networks. For example, a web site of the content provider may include an area that enables users to post personal profiles, and to receive recommendations of other users having similar browsing behaviors.

Social networking application discovery. Social Networking applications, such as Facebook and Open Social applications, can be treated as another type of item. Developers of such applications could join the network as CPC participants to automatically promote their social networking applications to users of similar applications.

Newspaper site. The widget service may be used by a newspaper publisher to increase the frequency and duration of customer visits to the newspaper's web site 104A. Beneficially, use of the content provider system's widgets may provide the end user 106 with links to additional content of interest on the web site 104A (other web sites 104) based on the end-user's collective behavior on this and other member sites 104. The content provider system may be configured to support the ability to provide recommendations of items such as news articles, including article associations, which are filtered by category. The filtered articles may be further ranked by popularity. In addition, sub-categories which further refine the category of the items may be supported. FIG. 2 provides an example of a news site so configured. By providing recommendations related to current browsing behaviors, widget-provided content may encourage the end user 104 to read more content on the web site 104A or other web sites 104. As each page may contain paid advertisements, the newspaper may obtain more revenue with each page the end user selects. Furthermore, as many newspaper web sites charge subscription fees, raising the end user's awareness of additional content of interest may engender loyalty and drive the growth of the subscriber base.

V. ASSOCIATION MINING (FIG. 4)

The association mining component 145 (FIG. 1) may generate item association datasets or tables for different types of items and events. For example, a dataset of purchase-based item associations may be generated based on stored purchase event data, and a separate dataset of viewing-based item associations may be generated based on stored viewing event data. The association mining algorithms may optionally use event timestamps to accord greater weight to more recent events, such that the detected associations strongly reflect current item preferences of users. The timestamps can also be used to accord greater weight to events made in close temporal proximity to each other; for example, two purchases made on the same day may be treated as more closely related than two purchases made on different days. Examples of association mining methods that may be used are described in the following patent references, the disclosures of which are hereby incorporated by reference: U.S. Pat. No. 6,912,505; U.S. application Ser. No. 10/766,368, filed Jan. 28, 2004; and U.S. application Ser. No. 10/864,288, filed Jun. 9, 2004.

Figure 4:
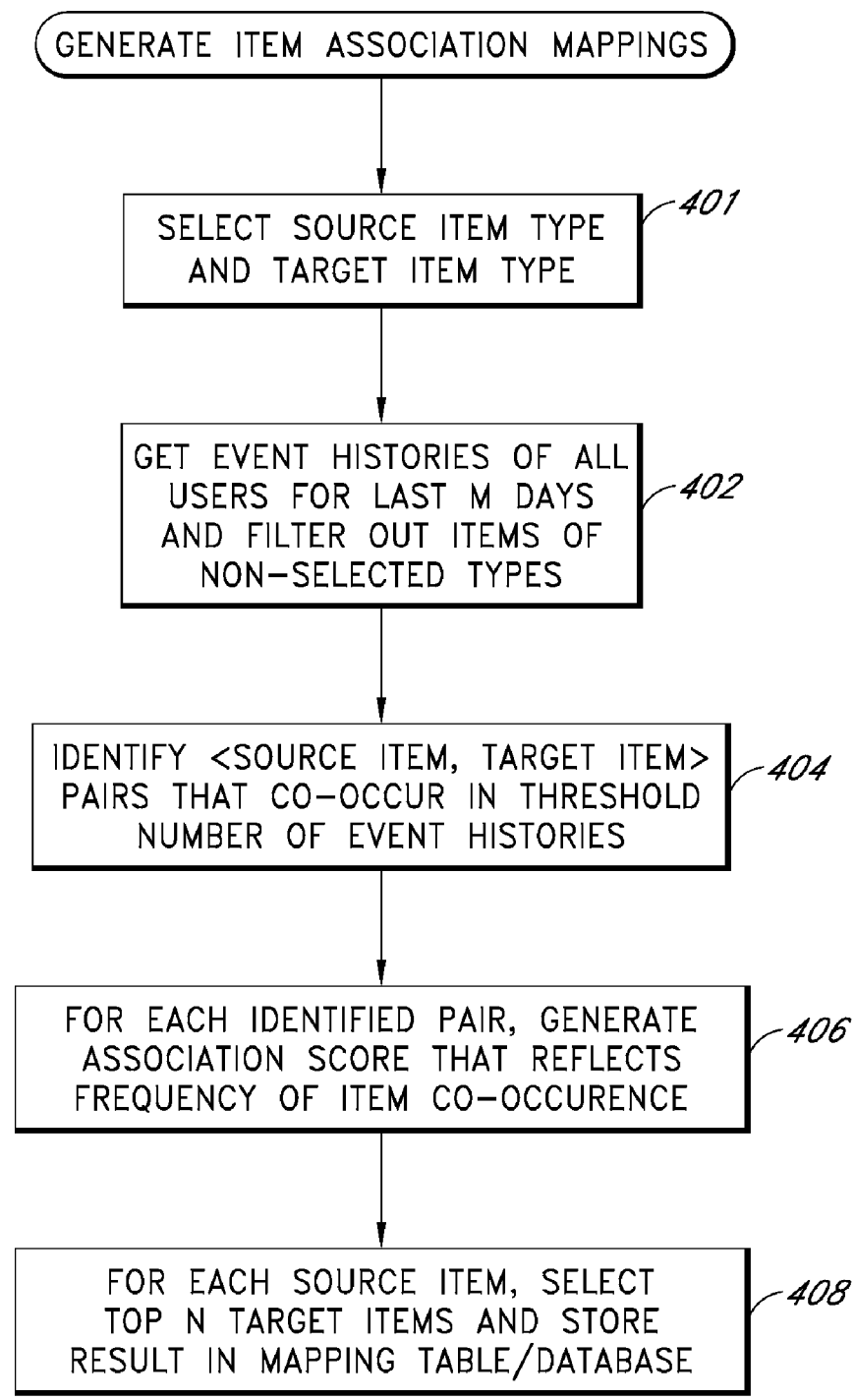
FIG. 4 illustrates one embodiment of a method of generating item-to-item association mappings using collected behavioral data.

An example process for generating item association mappings is illustrated in FIG. 4. In block 401, the process selects a source item type and a target item type. For example, to generate a mapping that maps web sites 104 to related products, the source item type would be "web site" and the target item type would be "product." Different datasets may be generated for different combinations of these two parameters (e.g., website to website, website to product, website to product category, keyword to product category, tag to product, page to page, page to product, etc.).

In block 402, the process retrieves the event histories of some or all users, where an event history is a record of at least some of the events attributed to a particular user. A given event history may reflect a user's accesses to many different web sites, including both member sites 104 and a site operated by the content provider. In some cases, multiple event histories may exists for the same user, each of which may be analyzed independently of the others.

At block 404, the process identifies <source item, target item> pairs that co-occur in a threshold number of event histories. Item pairs that do not satisfy a particular constraint may be ignored during this process; for instance, when generating movie-to-movie mappings, movie pairs with dissimilar MPAA ratings may be ignored. At block 406, the process generates an association score for each <source, target> pair that reflects the frequency of co-occurrence of the source and target items in the event histories. Various other criteria may also be taken into consideration in generating such scores; for instance, a boost may be given to higher-profit items. At block 408, for each source item, the process selects the top N (e.g., twenty) associated target items, ranked by association score, and stores the resulting list of target items and scores in a mapping table in the database 147.

In addition to detecting associations between disparate item types, associations may be mined using a source event type that differs from a target event type. For example, by using a source event type of "view" and a destination event type of "purchase," associations may be generated of the form "people who viewed this item also purchased the following items." For instance, a dataset may be generated that associates accesses to member sites with purchases of particular products or rentals of particular DVDs/movies.

VI. WEB SITE REGISTRATION AND WIDGET CUSTOMIZATION (FIG. 5)

A web site operator wishing to customize its site 104 with one or more widgets may first be required to register with the content provider system 100 to use the widget service. Alternatively, the content provider system could publish a generalized widget that any operator may use on its web site 104 without registration.

Figure 5:
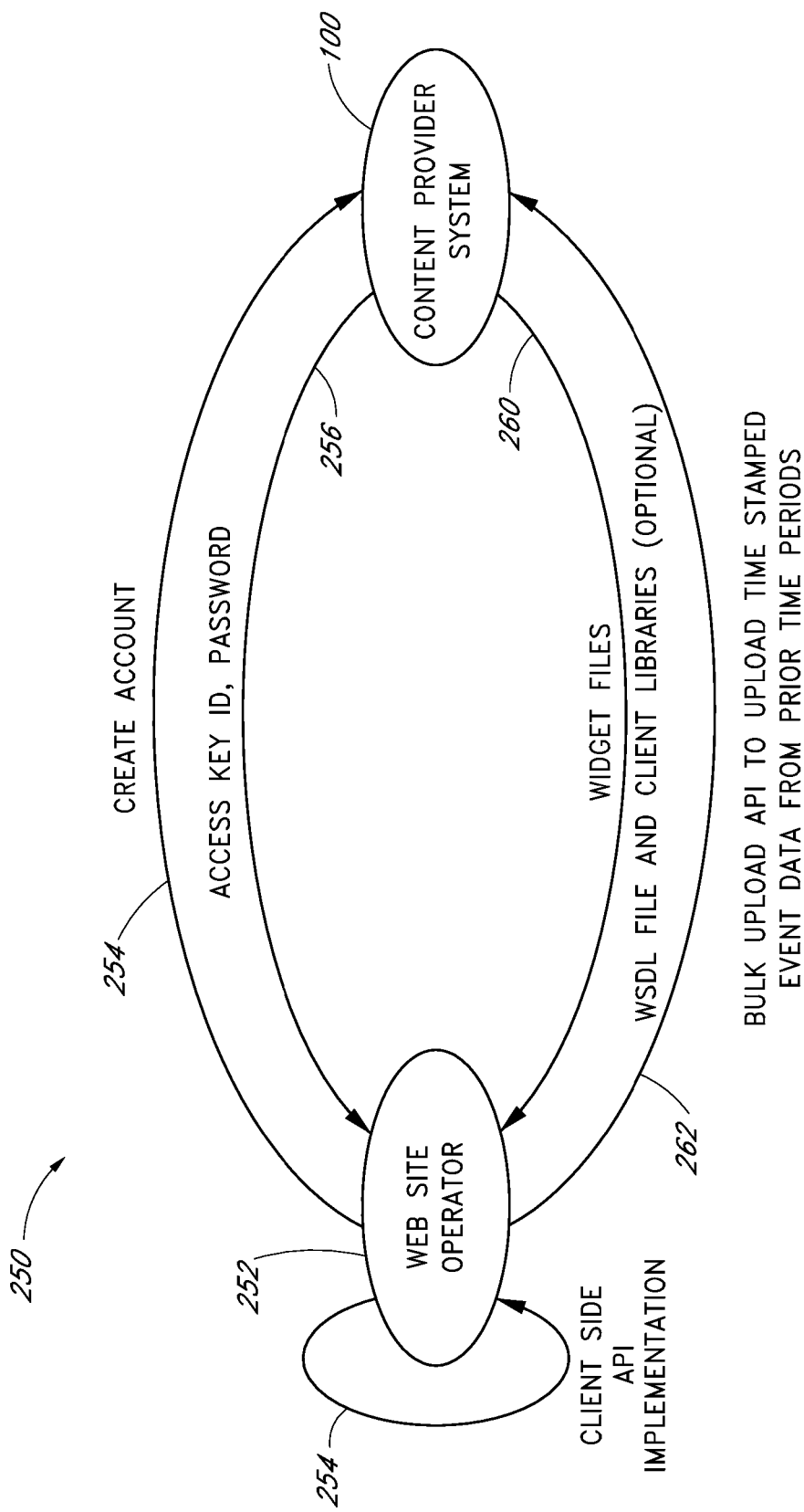
FIG. 5 illustrates an embodiment of a process by which a web site operator may register with, and configure its web site to interact with, the content provider system.

FIG. 5 illustrates one embodiment of a method 250 by which a web site operator 252 may register with, and configure its web site to interoperate with, the content provider system 100. This particular method is tailored for relatively advanced web site operators, and includes steps that may be omitted. For instance, although a web services interface is exposed to site owner/operator in this example, all of the features described above can be implemented without exposing a web services interface to any of the site owners.

In event 254, the web site operator 252 creates an account with the content provider system 100. A web portal or web site may be provided for this purpose, such as that illustrated at 160 of FIG. 1. Returning to FIG. 5, during registration, the web site operator 252 may provide various types of information such as an email address, a web site URL, a web site classification, and account and/or payment information.

In event 256, following account creation, the web site operator 252 optionally receives a Web Services Access Key ID and a password from the system 100, such as by accessing a personalized account page. The Web Services Access Key ID and password may be used to sign widget requests for authentication. In embodiments in which the web services interface is not exposed, the web site operator 252 may be given a unique member ID to be included in widget-generated requests.

In block 260, after registration, the web site operator may retrieve some or all of the following: widget code, a WSDL file which describes the content provider system's interface to widgets, and a WSDL file which describes the content provider system's interface for member web sites 104. The WSDL files may be omitted, particularly in embodiments or use case scenarios in which a web services interface is not exposed to the web site operators. The web site operator 252 may use the widget code provided or the WSDL interface description to generate client side code on the web site 104 using well known methods. For example, the web site operator may use a commercially available toolkit to generate the widget code from the WSDL file. This client side code implements a client side API implementation 214. Alternatively, the content provider system 100 may, via an interactive widget generation tool, generate widget code that the site owner can cut-and-paste into one or more HTML files.

The web site operator 252 may also be given access to a client library 216 which includes code for common API calls. In one embodiment, the client library 216 provides a bulk upload interface for at least two of the API calls, Set Stop List and Record Event. Other types of tools, such as a getting started guide, a developer guide, and/or online documentation, may additionally be made available.

In block 262 of FIG. 5, the web site operator 252 optionally uses the bulk upload API to provide preexisting end user history data (event data) to the content provider system 100. To perform a bulk upload in one embodiment, the web site operator creates and then uploads a file containing event data (User IDs, event types, item IDs and types, and event timestamps) describing previously recorded events. Uploading such previously collected data allows the content provider system 100 to more rapidly detect intra-site associations between particular items on the web site operator's site 104.

During or following registration, a web site operator may use the content provider system 100 to specify various widget-related preferences, such as the type or types of behavioral content to be displayed on its web pages. These preferences may be specified via the widget configuration portal 160 (FIG. 1), and may be stored in an associated database 141 and/or incorporated into the widget code. When the content provider system 100 receives a widget-generated request 120 for content, it may look up some or all of the site owner's preferences from the database 141, and use these preferences to select the particular type or types of behavioral content to display.

Various types of customization may be supported. The system 100 may allow a web site operator to specify different widget customization preferences for different pages of its web site 104. This may be accomplished by having a configuration page for each widget, or by having a system by which widget customizations are inherited hierarchically or shared.

The following is a listing of a few types of customizations which may be offered to web site operators 104. This list is not exclusive, and it is not required that the content provider system implement all (or even a subset) of these options.

Widget display attributes—Allows the operator to specify the size, color, and/or display format used for displaying widget content 126.

Display Related Items—If selected, the widget may display descriptions of items that are behaviorally associated with the page, site, or other item being viewed. The site owner may also have the option to limit the display to related items within its own site 104.

Provide Personalized Recommendations—If selected, the widget content may include personalized recommendations of items. The web site operator may also be able to specify the type or types of behavioral events (views, purchases, etc.) to be used to generate the recommendations.

Item Categories—Allows the web site operator to specify one or more categories of items that are or are not to be displayed (e.g., web sites, podcasts, products, videos, books, etc.).

Expose this site on other sites—If selected, widgets on other web sites and pages may display links to the home page and/or other pages of the current site.

Display outbound links to other member sites—If selected, the widget content may include inter-site links to other member sites 104. The web site operator may, in some embodiments, opt to only display links to member sites 104 that offer a referral fee.

Pay for incoming links or traffic. This option may be selected if the site owner is willing to pay operators of other member sites 104 for displaying links to the current site. A site owner that selects this option implicitly elects to expose its site on other member sites. The payments may be based on a cost-per-click (CPC) model, pay-per-impression model, pay-per-transaction model, or any other revenue model. In one embodiment, a CPC model is used with a fixed CPC amount that applies to all member sites 104.

Member site blacklist—Allows the operator to provide a list of member sites 104 to which no outbound links are to be displayed on the current site. For example, the operator could prefer not to provide links to competitors or sites with objectionable content. The system 100 may also provide an option to create a white list. The system may also support the ability for the operator to specify entire categories of member sites to be included or excluded.

Use Thumbnail Images—Allows the operator to specify whether images, such as thumbnail depictions of recommended items, should be included in the widget content.

Participate in Affiliate Marketing Program. If selected, the widget content 126 will include personalized and/or non-personalized recommendations of catalog items available on the content provider's site. When a user clicks on such a product and then makes a purchase, the content provider will pay the site owner a commission. The affiliates program may otherwise be implemented as described in U.S. Pat. No. 6,029,141, the entire disclosure of which is hereby incorporated by reference.

VII. WIDGET-BASED EVENT REPORTING AND STORAGE

A widget-generated request from a user's browser to the content provider system 100 may include a specific API call which directs the content provider system 100 to store the event. Alternatively, the widget may simply report event data, and the content provider system 100 may determine whether or not to store the event. The event data may be reported via a dedicated request, or as part of a request for widget content 126. The types of user-generated events that may be reported by the widgets and recorded by the content provider system 100 may include, for example, viewing items, purchasing items, renting items, downloading items, placing items in an electronic shopping cart, rating items, submitting comments on items, and keyword searches. Supplementary information regarding each such event may also be reported, such the type of the event, an identifier of the user (which may be a session ID if the user is unknown or unrecognized), and an identifier of the item.

The web site 104A may dynamically "fill in" parameters such as an API call, item identifiers, and so forth. For example, the widget, once instantiated on an end-user's device 106, may determine parameters from the context of the web page 125. Those of reasonable skill in the art will recognize that the widget may do so, for example, by dynamically examining the web page's document object model. For example, the widget could be set to choose the text in the largest header of the web page to serve as an item identifier and the item type identifier could be inferred from a hierarchical analysis of the page's navigation options. On the other hand, information which is not explicitly reported by the widget, either through being "filled in" by the operator or inferred by the widget itself, may be inferred by the content provider system 100. For example, the content provider system may use the referring URI (Uniform Resource Identifier), transmitted as part of the widget-generated request 120, as the item identifier when the request does not explicitly include an item identifier.

One example of a web services interface that may implemented by the system 100, including example API calls, parameters and operations that may be used to record widget-reported events, and to retrieve behavioral content are described in U.S. application Ser. No. 11/694,758, referenced above. In some embodiments, this web services interface is used internally to the system 100 without being exposed to site owners. For instance, when a particular server of the content provider system 100 receives a widget-generated request, this server may use the web services interface to generate one or more corresponding API calls to one or more internal services. Alternatively, as mentioned above, some or all details of the web services interface may be exposed to outside entities such that API calls can be made directly by the widgets.

VIII. END-USER PREFERENCES

The content provider system 100 may, in some embodiments, enable registered end users to specify one or more types of widget-related preferences. For example, end-users may be able to set a privacy option in which the content provider system 100 refrains from persistently recording the user's actions on member sites 104. Other settings may include one or more of the following: (a) whether to be greeted by name by widgets on member sites, (b) types of items to be displayed, (c) whether to be presented with personalized recommendations. The user's preference settings may be encoded in a cookie that is written to the end-user's computing device 106 and returned with each widget-generated request.

IX. WIDGET-BASED REPORTING AND DISPLAY OF USER FEEDBACK (FIG. 6)

Figure 6:
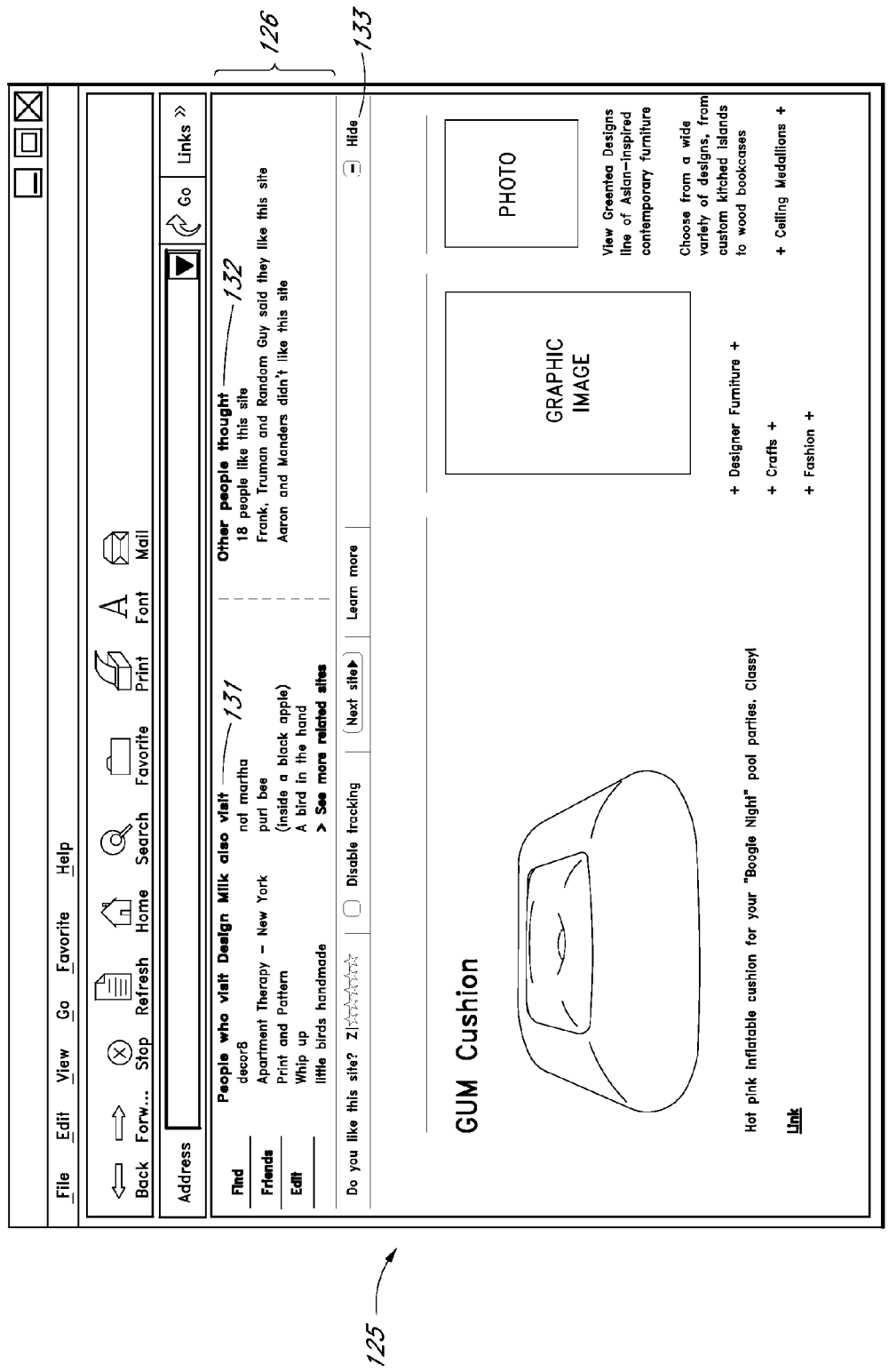
FIG. 6 schematically illustrates another embodiment of a web site configured to utilize widgets that retrieve content from the content provider system.

FIG. 6 illustrates an embodiment in which the widget content display area 126 includes content supplied by other users who have viewed the site. Here, the content provider system is providing recommendations 132 from other end-users with respect to the current web site 104A and web page 125. Such a system could be implemented by adding a new event type "Recommend," wherein end-users can recommend a web site 104A or item. The content provider system 100 may then subsequently create widget content that informs other users that the end-user 106 has recommended the particular web site or page. Advantageously, the content provider system 100 may provide similarities-like mappings of end-users to other end-users, wherein an end-user 106 will see the recommendations 132 of other users who have previously recommended the same (or similar) items as the end-user.

X. ACCOUNTING FOR SITE-TO-SITE REFERRALS

Figure 7:
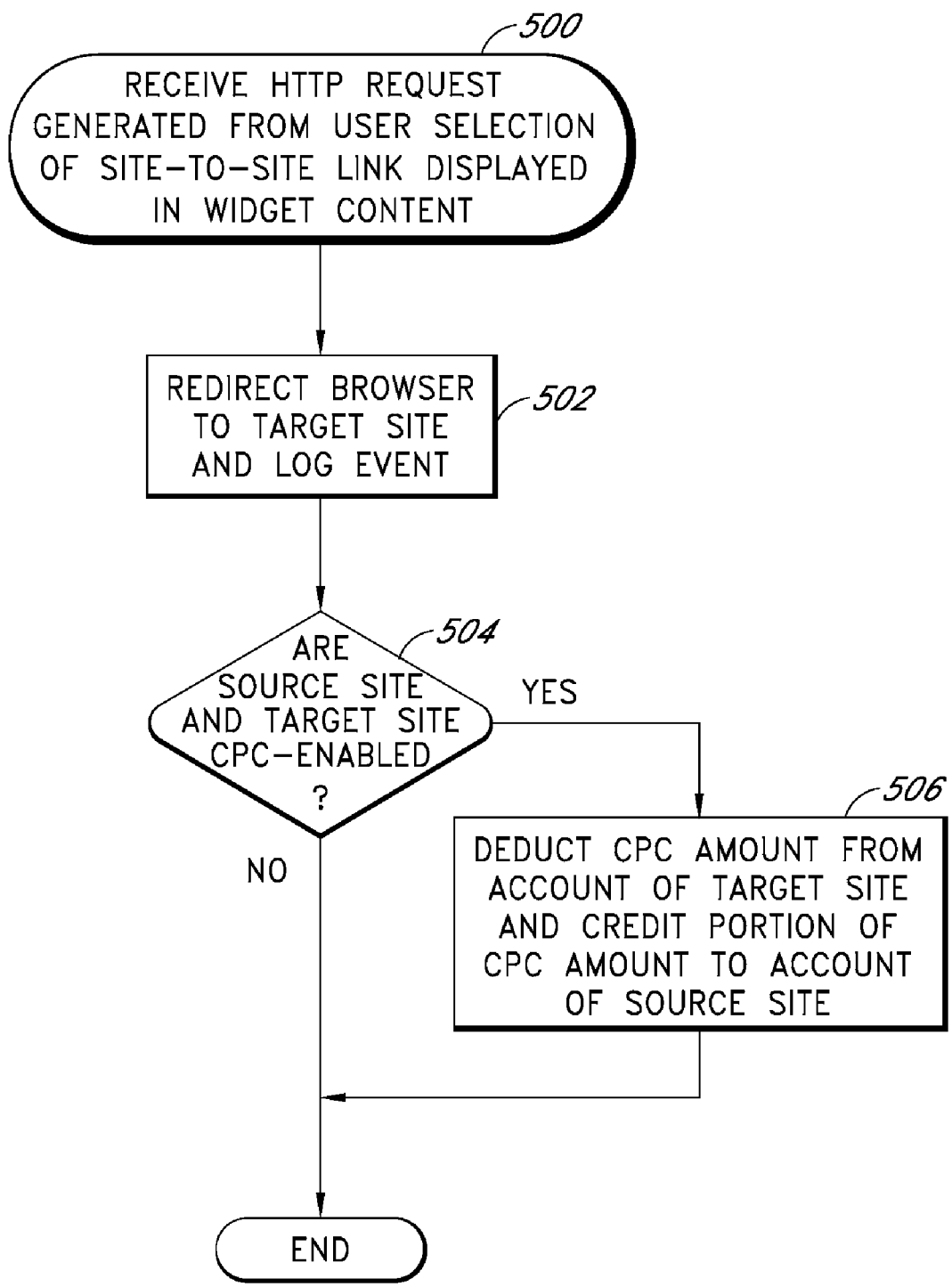
FIG. 7 illustrates a sequence of steps that may be performed by the content provider system to charge and pay operators of member web sites for user referrals.

FIG. 7 illustrates a method that may be implemented by the content provider system to implement cost-per-click (CPC) referral model. In particular, the drawing illustrates the steps that may be performed by the system 100 when a user clicks on a widget-displayed link from one member site 140 to another member site 140. The hyperlink reference may be similar to href=www.cps.com/redirect?source=website1url&target=website2url&member=a5 db . . . , where the parameter "source" is the URL or web site on which the widget content is displayed, the parameter "target" is the URL to which the browser is to be redirected, and the parameter "member" specifies the member ID of the member site 140 or its operator. Other parameters (not shown), such as Item ID, may also be included, and the request may be accompanied by a tracking cookie that identifies the user.

At block 502, a web server 121 of the content provider system 100, upon receipt of a redirect request from the user's browser 124, redirects the browser to the target URL. Such redirection may be accomplished, as is known in the art, through a response which includes html meta tag redirection, 301 redirection, or similar mechanisms. Advantageously, the web server 101 records the redirection/item selection event in the event history data repository as part of the user's event history.

At block 504, the content provider system, and more specifically the accounting component 130, may attempt to account for the redirection event. As shown in FIG. 1, the accounting component 130 may retrieve account preferences from the repository 141. If either the target or the source is not CPC-enabled, the accounting component 130 may cause a notification to be sent to the non-CPC enabled web site operator (not shown). The notification may include an estimate as to the amount of revenue that may be generated by the non-CPC enabled web site operator if it were to enable CPC, and may include instructions for how to enable CPC accounting. In other embodiments, as shown in FIG. 7, if either the source or the target are not CPC-enabled, the accounting component may simply do nothing.

At block 506, if the source and target are not commonly owned, the accounting mechanism may debit or credit the source's account and may debit or credit a greater or lesser amount to the target's account. For example, for each redirection, the content provider system may deduct $0.30 from the target's account and credit $0.27 to the source's account. In such a system, the content provider system may be described as acting as an intermediary between the source and target, wherein the target pays $0.27 per redirect to the source (as payment for traffic) and $0.03 per redirect to the content provider system (as a usage fee). As another example, the content provider system may credit $0.10 to the target (as a stipend for providing content) while debiting $0.15 from the source (as a fee for providing content on the source's web page that an end-user has found interesting enough to click-through). Such a system may be advantageous for some source web sites if, for example, the web site has an additional revenue generation system (other than the content provider system) that pays for page views of the source.

Alternatively, if the source and target are commonly owned, the accounting mechanism may credit or debit a usage fee (or stipend) to the web site operator's account. For example, the content provider system may charge $0.10 the web site operator for each commonly-owned redirection as a fee for usage of the content provider system's recommendations, widgets, repositories, and so forth. Alternatively, the content provider system may credit the web site operator's account $0.10 for each commonly-owned redirection as a stipend for using the content provider system. Such a stipend may aid the owner of the content provider system in increasing usage and penetration of the content provider system. The content provider system may debit or credit differing amounts to different operators, types of web sites and items, time of day, etc.

These examples are merely illustrative, and numerous other revenue models are possible. For example, the content provider system 100 may provide commission-based revenue generation, wherein a target web site operator agrees to pay a commission to the content provider when a user that has been redirected to the target through a widget-displayed link subsequently performs an action (such as making a purchase) on the target web site. The commission may be set to occur only if the user purchases an item within a certain time period of being redirected.

The accounting system 130 may implement tracking of commission-based accounting by polling the event history repository 143 for an event history of the present user that satisfies the commission pattern. As an example, if a target has enabled purchase-based commissions for a given item, whenever a widget generates a request indicating that a given user has purchased that item, the accounting system may inquire into the event data repository 143 to determine if that user was previously directed to the target item or web page by clicking widget-generated content. In another embodiment, the widget may transmit session identifiers, and a commission accounting event will be generated by the accounting component 130 if the session history of the identifier indicates a redirect to an item and a subsequent purchase.

The content provider system may be configured to track multiple redirections across multiple sites in the same "browsing session" of an end-user. As an example of such "transitive" redirects, if an end-user is redirected from site A to site B, and then subsequently redirected from site B to site C, and then purchases an item on site C, the content provider system may generate commission events for site A and for site B. In some embodiments, site C will be debited a commission amount for both site A and B. In other embodiments, Site C will be debited a commission for site B, and site B will be debited a commission for site A.

The event histories and data relied upon by the accounting system need not be obtained solely from widgets. As mentioned above, the content provider system 100 may allow operators to self-report such data through the API, or data may be obtained from browser toolbar installations. User clickstream data may also be obtained from internet service providers and, generally, any entity or program with access to such data.

XI. AFFILIATE MARKETING PROGRAMS

An affiliates program may be implemented by providing additional customization options to web site operators through the mechanisms described above. The affiliates program may be implemented in connection with one or more web sites operated by the content provider, and/or one or more web sites operated by network members.

According to some embodiments, the content provider website is a merchant website that offers products for sale, rental, download or other consumption in an electronic catalog. With such a program, when a user clicks on a widget-displayed link on a member site 104 and then completes a transaction (e.g., makes a purchase) on the destination site, the operator of the destination site pays a fee (e.g. a percentage-based commission, a flat fee, etc.) to the member site's operator.

An operator wishing to enroll as an affiliate may be presented with a list of potential merchant sites. If the operator chooses one (or more) merchant sites, the operator's web site (or at least a given widget) then becomes an affiliate of the merchant site. Thereafter, the so-configured widgets of the content provider system 100 may preferentially provide recommendations to items sold by the merchant site. The operator may be able to set a custom affinity level, whereby the operator determines whether all, some, or most of the recommendations shown by a given widget will be to a given merchant system. The recommendations may optionally be limited to a subset of particular product categories, perhaps those corresponding to a theme of the affiliate site.

While the term "merchant" has been used for simplicity and ease of explication, nothing herein should be interpreted to limit merchant sites to systems that actually sell goods. Newspapers, blogs, search engines, DVD rental sites, and so forth could all serve as a merchant site.

Additionally, although illustrative examples herein are described as being implemented with merchant websites, it should be understood that such an affiliate program is not limited to the underlying content or service provided by the content provider system. Rather, the described fees paid to the operator of the member site 104 could be triggered for any activity resulting in connection with any remotely accessed content. For example, instead of products for sale, the content may be ad supported information or services, such as news articles, search engine results, web-based software applications, social networking profiles or blog entries. In such a case, the fee may be paid to the member web site operator dependent upon, for example, the referred user performing an activity that generates ad or other revenue (or provides any benefit at all) for the web site operated by the content provider 100 (e.g. clicking on or viewing an advertisement, opening an account, etc.).

As a more concrete example, the content provider system 100 may operate a dating web site that generates revenue through user subscriptions and advertisements. Using the systems described above, it is determined that users browsing pages related to snow skiing and food related pages on member websites 104 also browsed a dating profile on the content provider system 100 of woman who is a professional chef and ski enthusiast. Accordingly, a link may be provided within widget display 126 to the woman's dating profile when the ski and food related pages are displayed by member sites 104. If a user follows this link to the woman's dating profile hosted by the content provider system 100, fees may be paid to the operator of the referring web site 104 based on a variety of subsequent activities, such as the user viewing the profile, opening an account, a successful completion of a date with the woman, a user click on advertising shown with the profile, among many other possibilities.

As yet other example, the content provider system 100 may host an Internet search web site that generates revenue, for example, by providing pay-per-click advertisements in conjunction with search results. According to this example, using the systems described above, it is determined that users browsing pages on member sites 104 related to snow skiing and food related pages on member websites 104 also searched for the term "ski resorts" on the content provider system 100. Accordingly, a link may be provided within the widget-displayed content 126 to a page displaying the search results for the term "ski resorts" when the ski and food related pages are displayed by member sites 104. If the user follows this link to the search results provided by the content provider system 100, fees may be paid to the operator of the referring web site 104 based on a variety of subsequent activities such as the user actually clicking on one or more of the pay-per-click advertising, among many other possibilities. In some embodiments, the search results can be dynamically updated to provide current search results upon the user's selection of the widget link, while in other embodiments the exact search results that were associated with the content on web sites 104 may be presented to the user.

XII. CONCLUSION

As will be recognized, the various features described above can also be used to display behavior-based content on other types of interactive computer systems, including interactive television systems, online services networks, systems providing syndicated feeds, and in-store kiosks. Further, although described in the context of widgets, other content-display mechanisms that provide similar functionality may alternatively be used.

All combinations of the various features described herein are contemplated, and are intended to fall within the scope of this disclosure. For instance, although the example item-to-item associations described herein correspond to specific item-type combinations (e.g., site-to-site, page-to-site, site-to-product, etc.), all combinations of the item types disclosed herein are contemplated and are intended to fall within the scope of this disclosure.

The foregoing description represents specific embodiments, and is not intended to be limiting. Other embodiments and applications that are apparent to those of ordinary skill in the art, including embodiments and applications that do not provide all of the features and benefits described herein, are also within the scope of this invention. The scope of the invention is defined only by the claims, which are intended to be construed without reliance on any definitions that may be implicitly or explicitly included in the incorporated-by-reference materials.

What is claimed is:

1. A system, comprising:
an e-commerce web site that hosts an electronic catalog of items, said e-commerce web site configured to at least partially implement an affiliates program in which affiliates that operate affiliate web sites are paid commissions for user referrals that result in purchases from the electronic catalog;
an event recording system that records events associated with user actions performed across a plurality of web sites, including said e-commerce site and said affiliate web sites,
an association mining system that uses the recorded events to detect behavioral associations that associate particular web sites of said plurality of web sites, and/or particular pages of said web sites, with particular catalog items in the electronic catalog; and
a content generation system configured to receive, from a user computing device that has loaded a web page of an affiliate web site, a request for content to display on said web page, and to respond to the request by at least (1) selecting, based at least partly on a behavioral association detected by the association mining system, at least one catalog item to present on said page, and (2) transmitting, from a server of the content generation system to the user computing device, a content object that includes a description of said catalog item and a link to a corresponding catalog page of said electronic catalog of the e-commerce web site, said link encoded with affiliate identification information for tracking a resulting user referral, said content generation system being separate from the affiliate web site.

2. The system of claim 1, wherein the content generation system is configured to interact with widget code included in the web page of the affiliate web site to cause said web page, as loaded on the user computing device, to display said link.

3. The system of claim 2, wherein the event recording system is configured to record item selection events reported via execution by user computing devices of said widget code.

4. The system of claim 1, wherein the content generation system is capable of using said behavioral associations to cause the web page of the affiliate web site to display recommendations of catalog items that are behaviorally related to the affiliate web site, said recommendations based on recorded behaviors of a plurality of users.

5. The system of claim 1, wherein the content generation system is capable of using said behavioral associations to cause the web page of the affiliate web site to display recommendations of catalog items that, based on recorded behaviors of a plurality of users, are behaviorally related to said web page.

6. The system of claim 1, wherein the content generation system is capable of using said behavioral associations, in combination with a prior event history of a target user, to generate personalized catalog-item recommendations to present to the target user on a page of an affiliate web site.

7. The system of claim 1, wherein the content generation system is capable of using recorded event data descriptive of an event performed by a target user on a first web site, in combination with behavioral association data generated by the association mining system, to select one or more items to recommend to the target user on an affiliate web site that is separate from the first web site.

8. The system of claim 7, wherein said behavioral association data includes a mapping of web sites to related catalog items.

9. A computer-implemented method, comprising:
maintaining event data descriptive of at least (1) items selected by users from a target web site, and (2) accesses by said users to a plurality of web sites other than said target web site;
detecting a behavioral association between a first web site of said plurality of web sites and a particular item represented on the target web site, said behavioral association detected, at least in part, by performing an aggregated analysis of said event data over multiple users;
receiving, from a user computing device that has loaded a page of an affiliate web site, a request for content to display on said page of the affiliate web site;
in response to said request, and based at least partly on the detected behavioral association, transmitting to the user computing device, from a server that is not part of the affiliate web site, a content object for display on the page of the affiliate web site, said content object including a description of the item and a link for accessing a corresponding page of the target web site, said affiliate web site being separate from the target web site; and
causing an operator of the affiliate web site to be compensated in response to the user selecting said link and completing a transaction on the target web site.

10. The method of claim 9, wherein the item is a catalog item represented in an electronic catalog of the target web site.

11. The method of claim 9, wherein the target web site is an e-commerce web site.

12. The method of claim 9, wherein the method comprises interacting over a network with widget code included in the page of the affiliate web site to cause said catalog item to be presented on said page.

13. The method of claim 12, wherein maintaining said event data comprises recording events reported over a network by user computing devices via browser execution of said widget code.

14. The method of claim 9, wherein the first web site and the affiliate web site are the same web site.

15. The method of claim 9, wherein the first web site and the affiliate web site are separate, and the method comprises causing said item to be recommended to a user on the page of the affiliate site based on a prior access by the user to said first web site.

16. The method of claim 9, wherein the method comprises causing one or more pages of the affiliate web site to display items determined from said aggregated analysis to be behaviorally related to the affiliate web site.

17. The method of claim 9, wherein the method comprises causing one or more pages of the affiliate web site to display personalized catalog-item recommendations to a user.

18. A content provider system, comprising:
an event recording system configured receive event data reported over a network by user computing devices, said event data reflecting browsing behaviors of a plurality of users across a plurality of sites, including a shopping site that provides an affiliate program and an affiliate site that is a participant in the affiliate program;
an association mining system configured to detect behavioral associations based on said event data, including behavioral associations between the affiliate site and particular catalog items represented on the shopping site; and
a content server system comprising computer hardware, said content server system configured to receive, from a user computing device that has loaded a page of the affiliate site, a request for content to display on said page, and to respond to the request at least partly by transmitting to the user computing device, for display on the page, a content object that includes catalog-item-specific links to pages of the shopping site that correspond to said particular catalog items, said content object based at least partly on said behavioral associations between the affiliate site and the particular catalog items, said item-specific links encoded with information for tracking user referrals to the shopping site.

19. The content provider system of claim 18, wherein the association mining system is configured to detect the behavioral associations between the affiliate site and particular catalog items based on recorded events of a plurality of visitors to the affiliate site.

20. The content provider system of claim 18, wherein the content server system is additionally configured to personalize the content object based on an event history associated with the user computing device.

21. The content provider system of claim 18, in combination with the affiliate site, wherein said page of the affiliate site includes browser-executable widget code configured to cause user computing devices to interact over a network with the content provider system.

22. A content provider system, comprising:
an event recording system configured receive event data reported over a network by user computing devices, said event data reflecting browsing behaviors of a plurality of users across a plurality of sites, including a shopping site that provides an affiliate program and an affiliate site that is a participant in the affiliate program;
an association mining system configured to detect behavioral associations based on said event data, including behavioral associations between the affiliate site and particular catalog items represented on the shopping site;
a content server system comprising computer hardware, said content server system configured to receive, from a user computing device that has loaded a page of the affiliate site, a request for content to display on said page, and to respond to the request at least partly by transmitting to the user computing device, for display on the page, a content object that includes catalog-item-specific links to pages of the shopping site that correspond to said particular catalog items, said content object based at least partly on said behavioral associations between the affiliate site and the particular catalog items, said item-specific links encoded with information for tracking user referrals to the shopping site; and a widget configuration portal configured to generate, based on preferences specified by an affiliate, browser-executable widget code that is configured to be added to one or more pages of the affiliate site, said widget code configured to cause a user computing device to report events to, and to request content from, the content provider system.

* * * * *